(12) United States Patent
Kondo et al.

(10) Patent No.: US 11,835,727 B2
(45) Date of Patent: Dec. 5, 2023

(54) INFORMATION PROCESSING APPARATUS AND INFORMATION PROCESSING METHOD FOR CONTROLLING GESTURE OPERATIONS BASED ON POSTURES OF USER

(71) Applicant: SONY GROUP CORPORATION, Tokyo (JP)

(72) Inventors: Akane Kondo, Tokyo (JP); Tomoya Narita, Tokyo (JP); Ryo Fukazawa, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 73 days.

(21) Appl. No.: 17/595,607

(22) PCT Filed: May 7, 2020

(86) PCT No.: PCT/JP2020/018497
§ 371 (c)(1),
(2) Date: Nov. 19, 2021

(87) PCT Pub. No.: WO2020/241189
PCT Pub. Date: Dec. 3, 2020

(65) Prior Publication Data
US 2022/0317462 A1 Oct. 6, 2022

(30) Foreign Application Priority Data
May 30, 2019 (JP) ................. 2019-101104

(51) Int. Cl.
*G02B 27/01* (2006.01)
*G02B 27/00* (2006.01)
*G06F 3/01* (2006.01)

(52) U.S. Cl.
CPC ..... *G02B 27/0179* (2013.01); *G02B 27/0093* (2013.01); *G06F 3/011* (2013.01); *G06F 3/017* (2013.01); *G02B 2027/0187* (2013.01)

(58) Field of Classification Search
CPC .... G02B 2027/0138; G02B 2027/0187; G02B 27/0093; G02B 27/0172; G02B 27/0179;
(Continued)

(56) References Cited

U.S. PATENT DOCUMENTS 9,164,588 B1* 10/2015 Johnson ................. G06F 3/017
9,448,687 B1* 9/2016 McKenzie ............ G06F 3/0481
(Continued)

FOREIGN PATENT DOCUMENTS

EP 3617851 A1 3/2020
JP 11-136704 A 5/1999
(Continued)

OTHER PUBLICATIONS

International Search Report and Written Opinion of PCT Application No. PCT/JP2020/018497, dated Jul. 28, 2020, 09 pages of ISRWO.
(Continued)

*Primary Examiner* — Richard J Hong
(74) *Attorney, Agent, or Firm* — CHIP LAW GROUP

(57) ABSTRACT

An information processing apparatus according to an embodiment of the present technology includes a physical information acquisition unit, a gesture information acquisition unit, a determination condition setting unit, and a control unit. The physical information acquisition unit acquires physical information of a user wearing a head-mounted casing. The gesture information acquisition unit acquires gesture information regarding a gesture of the user. The determination condition setting unit sets, on the basis of the physical information, a determination condition for determining a trigger gesture that is a trigger for an operation input by the gesture of the user. The control unit determines, on the basis of the gesture information and the determination condition, whether or not the trigger gesture is performed and controls, on the basis of a result of the determination, an output corresponding to the trigger gesture.

19 Claims, 10 Drawing Sheets

(58) Field of Classification Search
CPC ....... G02B 27/017; G06F 3/011; G06F 3/012; G06F 3/016; G06F 3/017; G06F 3/147; G06F 1/3287; G06F 3/0481; G06F 3/0482; G06V 20/20; G06V 40/19; G06V 40/20; G09G 2354/00; G09G 5/38; A63F 13/212
See application file for complete search history.

(56) References Cited

U.S. PATENT DOCUMENTS

| | | | |
|---|---|---|---|
| 2015/0130688 A1* | 5/2015 | Li | G02B 27/017 345/8 |
| 2015/0258431 A1* | 9/2015 | Stafford | A63F 13/212 463/31 |
| 2016/0018872 A1* | 1/2016 | Tu | G06F 1/3287 345/173 |
| 2016/0357266 A1* | 12/2016 | Patel | G06F 3/0482 |
| 2017/0140457 A1 | 5/2017 | Kaku et al. | |
| 2018/0188802 A1 | 7/2018 | Okumura | |
| 2018/0275837 A1* | 9/2018 | Getz | G06F 3/012 |
| 2020/0042105 A1 | 2/2020 | Tanaka | |
| 2020/0073481 A1 | 3/2020 | Mizunuma et al. | |

FOREIGN PATENT DOCUMENTS

| | | |
|---|---|---|
| JP | 11-161190 A | 6/1999 |
| WO | 2015/145544 A1 | 10/2015 |
| WO | 2018/131251 A1 | 7/2018 |
| WO | 2018/198499 A1 | 11/2018 |

OTHER PUBLICATIONS

Extended European Search Report of EP Application No. 20813600.2, dated Jun. 30, 2022, 10 pages.

* cited by examiner

INFORMATION PROCESSING APPARATUS AND INFORMATION PROCESSING METHOD FOR CONTROLLING GESTURE OPERATIONS BASED ON POSTURES OF USER

CROSS REFERENCE TO RELATED APPLICATIONS

This application is a U.S. National Phase of International Patent Application No. PCT/JP2020/018497 filed on May 7, 2020, which claims priority benefit of Japanese Patent Application No. JP 2019-101104 filed in the Japan Patent Office on May 30, 2019. Each of the above-referenced applications is hereby incorporated herein by reference in its entirety.

TECHNICAL FIELD

The present technology relates to an information processing apparatus, an information processing method, and a program that are capable of gesture operation.

BACKGROUND ART

Conventionally, there is known a technology that detects a motion of each site of a user. For example, an apparatus such as a head-mounted display (HMD) worn by the user detects a user motion and performs display control or the like of an image by using a detection result.

For example, Patent Literature 1 has described an HMD that combines and displays electronic information on an outside-world image observed in a field-of-view of a user. This HMD detects the user's head motion to thereby control display/non-display of an image display element that displays the electronic information. For example, in a case where the angular velocity or movement velocity of the user's head is above a predetermined threshold, the image display element is switched to the non-display. Accordingly, when the user starts walking or the like, the electronic information displayed in front of the eyes is not displayed, so that the field-of-view of the user can be ensured (paragraphs [0027], [0035], and [0038] in the specification, FIGS. 1 and 5, etc. of Patent Literature 1).

CITATION LIST

Patent Literature

Patent Literature 1: Japanese Patent Application Laid-open No. HEI 11-161190

DISCLOSURE OF INVENTION

Technical Problem

In recent years, there have been developed technologies that detect motions of user's head, arms, legs, and the like to thereby enable operation inputs based on gestures or the like to be performed. The gesture operations are expected to be applied in various scenes, and it is desirable to provide a technology capable of improving the operability of gesture operations.

In view of the above-mentioned circumstances, it is an object of the present technology to provide an information processing apparatus, an information processing method, and a program that can improve the operability of gesture operations.

Solution to Problem

In order to accomplish the above-mentioned object, an information processing apparatus according to an embodiment of the present technology includes a physical information acquisition unit, a gesture information acquisition unit, a determination condition setting unit, and a control unit.

The physical information acquisition unit acquires physical information of a user wearing a head-mounted casing.

The gesture information acquisition unit acquires gesture information regarding a gesture of the user.

The determination condition setting unit sets, on the basis of the physical information, a determination condition for determining a trigger gesture that is a trigger for an operation input by the gesture of the user.

The control unit determines, on the basis of the gesture information and the determination condition, whether or not the trigger gesture is performed and controls, on the basis of a result of the determination, an output corresponding to the trigger gesture.

In this information processing apparatus, the determination condition of the trigger gesture that is the trigger for the operation input by the gesture is set on the basis of the physical information of the user wearing the head-mounted casing. Whether or not the trigger gesture is performed is determined on the basis of this determination condition and the gesture information, and the output corresponding to the trigger gesture is controlled on the basis of the determination result. Accordingly, the trigger gesture performed by the user is determined in accordance with the physical information of the user, and therefore the operability of gesture operations can be improved.

The determination condition setting unit may set the determination condition on the basis of physical feature information of the user, the physical feature information corresponding to the physical information.

Accordingly, for example, a determination condition appropriate to a physical feature of the user can be set, and for example, the physical burden in performing the trigger gesture can be sufficiently reduced.

The physical feature information may include information regarding at least one of a field-of-view feature or a motion feature of the user.

Accordingly, for example, the determination condition is set in accordance with a field-of-view range, a motion range, and the like in a physical state of the user, and the user can easily perform a motion that is the trigger gesture.

The determination condition may include a determination threshold for determining the trigger gesture.

Accordingly, the trigger gesture can be easily distinguished from other gestures.

The physical information acquisition unit may acquire a posture of the user as the physical information. In this case, the determination condition setting unit may set the determination condition in accordance with the posture of the user.

Accordingly, for example, a determination condition appropriate to the posture of the user is set, and a motion that is the trigger gesture can be easily performed and the operability can be sufficiently improved.

The determination condition setting unit may set the determination condition in accordance with at least one of a field-of-view feature or a motion feature in the posture of the user.

Accordingly, for example, a determination condition appropriate to a field-of-view range and a motion range at each timing is set. As a result, the physical burden in performing a motion that is the trigger gesture can be greatly reduced, and excellent operability can be provided.

The trigger gesture may be a head gesture of the user moving the head upward. In this case, the determination condition may include a threshold angle with respect to a posture angle of the head of the user, the posture angle changing in a manner that depends on the head gesture. Moreover, the physical information acquisition unit may detect a standing state or a seated state as the posture of the user. Moreover, the determination condition setting unit may set, in a case where the seated state is detected, the threshold angle to be a smaller value than in a case where the standing state is detected.

For example, in the seated state, the line-of-sight tends to move downward as compared with the standing state. As described above, by setting the threshold angle, the burden on the body of the user who performs the gesture is reduced. Moreover, malfunctions in which motions that the user does not intend are determined as triggers and the like can be reduced.

The head-mounted casing may be a casing for a head-mounted display that displays a virtual image. In this case, the control unit may control a display position of the virtual image on the basis of the physical information.

Accordingly, the display position of the virtual image is adjusted in accordance with the physical information, and therefore display or the like easy for the user to view is realized. Accordingly, the operability can be sufficiently improved.

The physical information acquisition unit may acquire a posture of the user as the physical information. In this case, the control unit may control the display position of the virtual image in accordance with the posture of the user.

Accordingly, for example, the virtual image can be displayed at a position that the user can easily visually recognize irrespective of the posture of the user.

The virtual image may be an upper image to be displayed on a diagonally upper side as viewed from the user. In this case, the physical information acquisition unit may detect a standing state or a seated state as the posture of the user. Moreover, the control unit may set, in a case where the seated state is detected, the display position of the upper image to be a lower position than in a case where the standing state is detected.

Accordingly, the upper image can be displayed at a position easy for the user to view irrespective of the standing state and the seated state, and the physical burden can be sufficiently reduced.

The physical information acquisition unit may acquire a height of the user as the physical information. In this case, the virtual image may be a lower image to be displayed on a diagonally lower side as viewed from the user. Moreover, the control unit may set a display position of the lower image in accordance with the height of the user.

Accordingly, the lower image can be displayed at a proper position irrespective of the height of the user, and the physical burden can be sufficiently reduced.

The information processing apparatus may further include an environmental information acquisition unit that acquires environmental information regarding a surrounding environment of the user.

Accordingly, for example, a change or the like in the physical feature of the user due to a change in the surrounding environment can be reflected to each control.

The determination condition setting unit may set the determination condition on the basis of the environmental information.

Accordingly, the determination condition can be adjusted in accordance with the physical feature of the user or the like that depends on the surrounding environment of the user, and the operability can be sufficiently improved.

The trigger gesture may be a head gesture of the user moving the head upward. In this case, the determination condition may include a threshold angle with respect to a posture angle of the head of the user, the posture angle changing in a manner that depends on the head gesture. Moreover, the environmental information acquisition unit may detect presence/absence of a ceiling in the surrounding environment. Moreover, the determination condition setting unit may set, in a case where the ceiling is detected, the threshold angle to be a smaller value than in a case where the ceiling is not detected.

For example, in an environment where the ceiling is present, the line-of-sight tends to move downward as compared with an environment where the ceiling is absent. As described above, by setting the threshold angle, the burden on the body of the user who performs the gesture is reduced. Moreover, malfunctions in which motions that the user does not intend are determined as triggers and the like can be reduced.

The head-mounted casing may be a casing for a head-mounted display that displays a virtual image. In this case, the control unit may control a display position of the virtual image on the basis of the environmental information.

Accordingly, the display position of the virtual image is adjusted in accordance with the surrounding environment, and therefore display or the like easy for the user to view is realized. Accordingly, the operability can be sufficiently improved.

The environmental information acquisition unit may determine whether or not the surrounding environment includes a vanishing point. In this case, the control unit may set, in a case where the surrounding environment includes the vanishing point, the display position of the virtual image by using the vanishing point as a basis.

Accordingly, for example, the virtual image can be arranged in a range on which the lines-of-sight of the user concentrate, and the accessibility to the virtual image can be improved.

The environmental information acquisition unit may detect a position of a floor as the environmental information. In this case, the control unit may set the display position of the virtual image in accordance with the position of the floor.

Accordingly, for example, the virtual image can be displayed at a position easy to visually recognize irrespective of the height of the floor, and the accessibility to the virtual image can be improved.

The head-mounted casing may be a casing for a head-mounted display that displays a virtual image. In this case, the trigger gesture may function as a trigger for a display operation of causing the virtual image to be displayed, a trigger for a non-display operation of causing the virtual image not to be displayed, or a trigger for a selection operation of selecting the virtual image.

Accordingly, the operability in causing the virtual image to be displayed or not to be displayed, selecting the virtual image, and the like can be improved.

An information processing method according to an embodiment of the present technology is an information processing method to be performed by a computer system and includes acquiring physical information of a user wearing a head-mounted casing.

Gesture information regarding a gesture of the user is acquired.

A determination condition for determining a trigger gesture that is a trigger for an operation input by the gesture of the user is set on the basis of the physical information.

Whether or not the trigger gesture is performed is determined on the basis of the gesture information and the determination condition, and output corresponding to the trigger gesture is controlled on the basis of a result of the determination.

A program according to an embodiment of the present technology causes a computer system to execute the following steps.

A step of acquiring physical information of a user wearing a head-mounted casing.

A step of acquiring gesture information regarding a gesture of the user.

A step of setting, on the basis of the physical information, a determination condition for determining a trigger gesture that is a trigger for an operation input by the gesture of the user.

A step of determining, on the basis of the gesture information and the determination condition, whether or not the trigger gesture is performed and controlling output corresponding to the trigger gesture on the basis of a result of the determination.

MODE(S) FOR CARRYING OUT THE INVENTION

Hereinafter, embodiments of the present technology will be described with reference to the drawings.

[Configuration of HMD]

Figure 1:
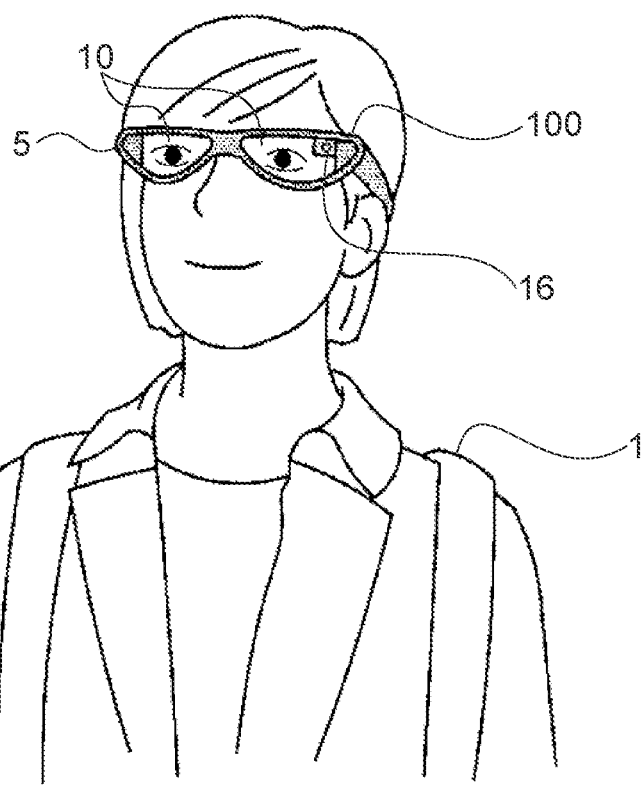
FIG. 1 A schematic diagram describing the outline of an HMD according to the embodiment of the present technology.

FIG. 1 is a schematic diagram describing the outline of an HMD according to an embodiment of the present technology. A head-mounted display (HMD) 100 is an eye-glasses-type apparatus including a see-through display and is used mounted on the head of a user 1. The user 1 wearing the HMD 100 is enabled to visually recognize a scene in reality and to visually recognize an image displayed on the see-through display at the same time. That is, the use of the HMD 100 enables a virtual image to be displayed superimposed on a space in reality (real space) surrounding the user 1. Accordingly, the user 1 can experience augmented reality (AR) or the like. The HMD 100 has a head-mounted casing 5. The head-mounted casing 5 is an outer casing of the HMD 100, and is configured to be capable of being mounted on a human head. A controller to be described later and the like (see FIG. 2) are mounted on this casing 5, so that the HMD 100 is configured. That is, the entire apparatus including the head-mounted casing 5, the controller, and the like is the HMD 100. The type of the head-mounted casing 5 (HMD 100) is not limited, and for example, the eye-glasses-type casing 5 may be replaced by an immersive casing or the like that is arranged to cover the head of the user 1. Alternatively, a head-mounted casing or the like configured to support a portable display apparatus (smartphone, game console, or the like) in front of the eyes of the user 1 may be used.

The user 1 who uses the HMD 100 can perform various operation inputs (gesture operations) through gestures. Here, a gesture of the user 1 means a motion of the user 1. For example, motions (extension and flex) of the user 1 tilting the head upward and downward, motions (lateral flex) of the user 1 tilting the head leftward and rightward, a motion (rotation) of the user 1 rotating the head (neck), and the like are included in gestures of the user 1 using the head. Moreover, motions of the user 1 moving the arms, legs, and the like, motions of the user 1 moving the entire body, e.g., squatting down, seating, and standing, or motions of the user 1 moving the line-of-sight, motions of the user 1 opening and closing the eyelids, a motion of the user 1 blinking, and the like are also included in the gestures of the user 1. Furthermore, gestures that are combinations of those motions can be performed.

When the user 1 wearing the HMD 100 performs a predetermined gesture, operation processing corresponding to the gesture is performed. For example, processing of switching display/non-display of a predetermined virtual image or the like is performed corresponding to a gesture of the user 1 tilting the head upward or downward. Alternatively, processing of selecting a target from a plurality of virtual images or the like is performed corresponding to a gesture of the user 1 rotating the head leftward or rightward. In addition, the types and the like of gestures and operation processing are not limited. As described above, in the HMD 100, various types of operation processing can be performed by operations of the user 1 him or herself, and virtual experience having a high degree of freedom can be realized.

Figure 2:
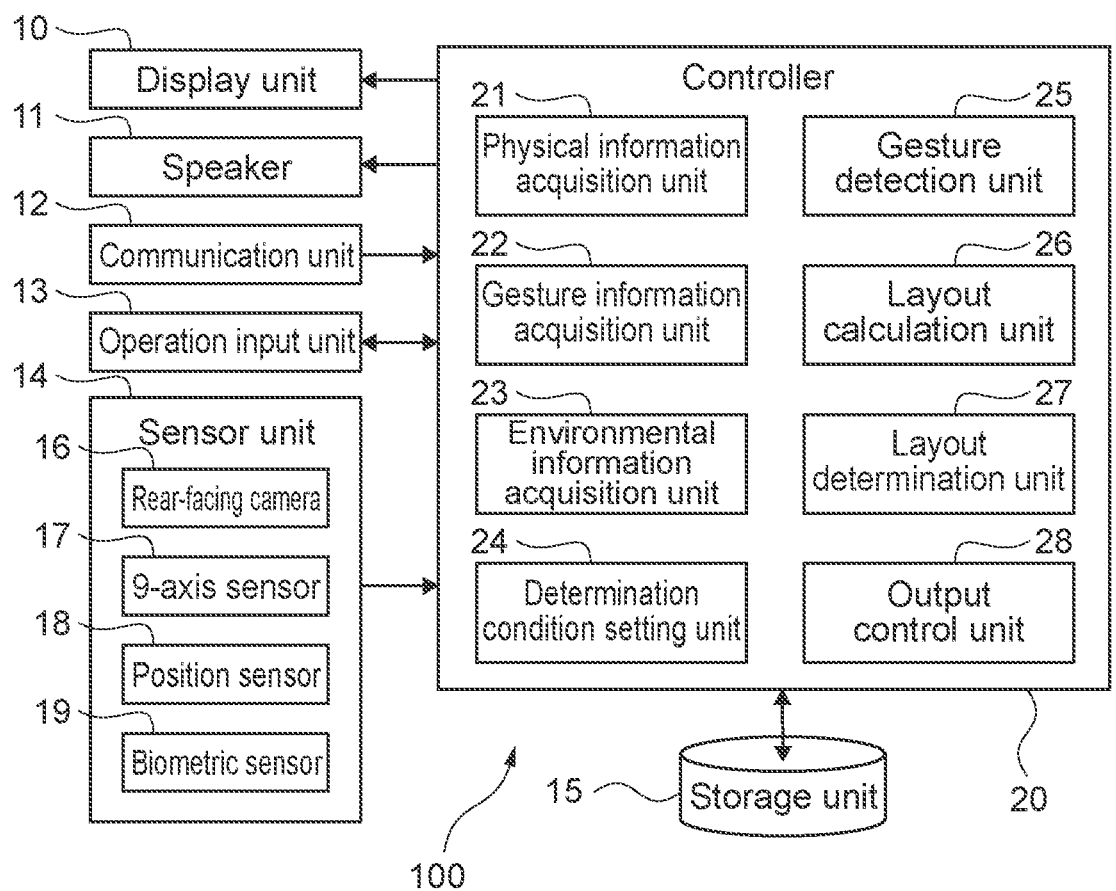
FIG. 2 A block diagram showing a configuration example of the HMD shown in FIG. 1.

FIG. 2 is a block diagram showing a configuration example of the HMD 100 shown in FIG. 1. The HMD 100 includes a display unit 10, a speaker 11, a communication unit 12, an operation input unit 13, a sensor unit 14, a storage unit 15, and a controller 20.

The display unit 10 is a see-through display that displays a virtual image, and arranged to cover at least a part of a field-of-view of the user 1. In the HMD 100 shown in FIG. 1, see-through displays for the left and right eyes are arranged in front of the left and right eyes of the user 1, respectively. It should be noted that the present technology is not limited to the configuration to display a virtual image to both eyes of the user 1, and for example, the display unit 10 may be configured to display a virtual image only to one eye of the user 1. As the display unit 10, for example, a see-through organic EL display, liquid-crystal display, or the like is used. In addition, the specific configuration of the display unit 10 is not limited, and a see-through display of an arbitrary type such as a type that projects an image on a transparent screen and a type that displays an image by the use of a prism and the like may be used.

The speaker 11 is, for example, arranged near the ear of the user 1, and reproduces audio signals in accordance with, for example, content being executed in the HMD 100. The communication unit 12 is a communication module for sending and receiving data to/from another apparatus with a wire or wirelessly. The communication unit 12 performs communication between the HMD 100 and an external apparatus or the like by, for example, a method such as a wired local area network (LAN), a wireless LAN, wireless fidelity (Wi-Fi) (registered trademark), infrared communication, Bluetooth (registered trademark), and short-distance/contactless communication. The operation input unit 13 has a physical operation mechanism such as a switch, a button and a lever. For example, by the user 1 operating the operation input unit 13, various operations are received.

The sensor unit 14 acquires various types of information regarding the user 1 and the surrounding environment of the user. The sensor unit 14 includes a rear-facing camera 16, a 9-axis sensor 17, a position sensor 18, and a biometric sensor 19. In FIG. 1, the rear-facing camera 16 is schematically shown as an example of the sensor unit 14. Moreover, the 9-axis sensor 17, the position sensor 18, and the biometric sensor 19 are arranged as appropriate, for example, at predetermined positions inside the casing constituting the HMD 100. It should be noted that the types, the number, and the like of the sensors provided in the sensor unit 14 are not limited, and for example, an atmospheric sensor, a temperature sensor, and the like may be provided.

The rear-facing camera 16 is arranged to face the front of the HMD 100 and takes an image in the real space that is included in the field-of-view of the user 1. As the rear-facing camera 16, for example, a digital camera including an image sensor such as a CMOS sensor and a CCD sensor is used. Alternatively, for example, a stereo camera capable of detecting depth data or the like in the real space or a camera equipped with a time of flight (TOF) sensor or the like may be used as the rear-facing camera 16. The image data or depth data detected by the rear-facing camera 16 is used for various types of recognition processing such as object recognition in the real space and recognition of hands of the user 1. Moreover, such data is used for processing such as simultaneous localization and mapping (SLAM) that estimates the self-position of the user 1 and generates a surrounding-space map or the like. The specific configuration of the rear-facing camera 16 is not limited, and for example, an arbitrary camera sensor capable of sensing the real space at a desired accuracy may be used as the rear-facing camera 16.

The 9-axis sensor 17 includes a 3-axis acceleration sensor, a 3-axis gyro sensor, and a 3-axis compass sensor. The 3-axis acceleration sensor detects acceleration in three axial directions of the HMD 100. The 3-axis gyro sensor detects angular velocity (rotation velocity) around the three axes of the HMD 100. The 3-axis compass sensor detects geomagnetic force (direction) in the three axial directions. Each type of data detected by the 9-axis sensor 17 is used for processing of detecting a posture, a motion, and the like of the head of the user 1 wearing the HMD 100 and processing of recognizing behaviors of the user 1, such as a standing motion and a seating motion. Moreover, such data is used for detecting the posture, the orientation, and the like of the user 1 in the space map configured by the use of the SLAM or the like.

The position sensor 18 detects a current position of the HMD 100 (user 1) on the basis of an externally acquired signal. For example, the position sensor 18 is configured as a global positioning system (GPS) position-measuring unit, and receives radio waves from a GPS satellite block and detects a position at which the HMD 100 is present. Moreover, the position sensor 18 may be configured to detect the position by, for example, Wi-Fi (registered trademark), Bluetooth (registered trademark), sending and receiving to/from a portable phone, a PHS, a smartphone, or the like, short-distance communication, or the like other than the GPS. Alternatively, for example, the position of the HMD 100 may be detected by detecting makers or the like arranged in the periphery of the user 1. In this case, the position sensor 18 can be realized using the above-mentioned rear-facing camera 16 and the like. In addition, the specific configuration of the position sensor 18 is not limited.

The biometric sensor 19 detects biometric data. For example, as the biometric sensor 19, a front-facing camera that takes images of the eyes of the user 1 is used. The eye image is used for, for example, processing of detecting a line-of-sight direction, a gazing time, and the like of the user 1. Alternatively, for example, the biometric sensor 19 that detects a body movement, a body position, and the like of the user 1 may be mounted and a detection result thereof may be used for processing of detecting a posture and the like of the user 1. In addition, the type and the like of the biometric sensor 19 are not limited, and for example, a sensor capable of detecting a pulse rate, a body temperature, sweat, a blood pressure, sweat, pulses, respiration, eyeblink, an eye movement, a pupil diameter, a blood pressure, brain waves, a skin temperature, electric skin resistance, micro vibration (MV), myopotential potential, blood oxygen saturation ($SpO_2$), or the like may be used as appropriate.

The storage unit 15 is a nonvolatile storage device, and for example, a hard disk drive (HDD), a solid state drive (SSD), or the like is used. The storage unit 15 stores map data and a control program. The map data is data that functions as map data relating to the real space, and for example, the space map (three-dimensional model of the surrounding environment) or the like generated by the use of the SLAM or the like is used. The control program is a program for controlling operations of the entire HMD 100. The method of installing the map data and the control program into the HMD 100 is not limited.

The controller 20 controls the operation of each block of the HMD 100. The controller 20 has a hardware configuration necessary for a computer, such as a CPU and a memory (RAM, ROM), for example. By the CPU loading the control program stored in the storage unit 15 into the RAM and executing it, various types of processing are performed. The specific configuration of the controller 20 is not limited, and for example, a programmable logic device (PLD) such as a field programmable gate array (FPGA) or another device such as an application specific integrated circuit (ASIC) may be used as the controller 20. The controller 20 corresponds to an information processing apparatus according to this embodiment. Moreover, the HMD 100 is an apparatus in which the controller 20 is mounted on the head-mounted casing 5. Thus, in this embodiment, it can also be said that the HMD 100 itself functions as the information processing apparatus.

In this embodiment, by the CPU of the controller 20 executing the program (control program) according to this embodiment, a physical information acquisition unit 21, a gesture information acquisition unit 22, an environmental information acquisition unit 23, a determination condition setting unit 24, a gesture detection unit 25, a layout calculation unit 26, a layout determination unit 27, and an output control unit 28 are realized as functional blocks. Then, an information processing method according to this embodiment is performed by those functional blocks. It should be noted that dedicated hardware such as an integrated circuit (IC) may be used as appropriate in order to realize the respective functional blocks.

The physical information acquisition unit 21 acquires physical information of the user 1 wearing the HMD 100. The physical information is information regarding the body of the user 1. The physical information includes, for example, information that changes over time, such as posture and motion of the user 1, and information specific to the user 1, such as age and gender of the user 1. Such physical information can represent a physical state of the user 1 wearing the HMD 100. That is, it can also be said that the physical information is information indicating the physical state of the user 1.

The physical information acquisition unit 21 acquires a posture of the user 1 as the physical information. Specifically, posture detection processing of detecting the posture of the user 1 is performed on the basis of an output result of each sensor or the like included in the above-mentioned sensor unit 14. In this embodiment, the physical information acquisition unit 21 detects a standing state or a seated state as the posture of the user 1.

For example, by monitoring acceleration output from the 9-axis sensor 17, acceleration or the like at the time when the user 1 stands up or sits down is detected and a current posture (standing or sitting) of the user 1 is detected. Alternatively, the standing state or the seated state may be detected, for example, using changes in the pulse rate and blood pressure measured by the biometric sensor 19, a change in the atmospheric pressure, or the like. Moreover, integrating those sensor outputs, the posture of the user 1 can also be detected. In addition, processing of determining whether the user 1 is standing or seated may be performed by machine learning or the like. It should be noted that other than the standing state and the seated state, a state (laying-down state) in which the user 1 is laying down, a state in which the user 1 is squatting down, and the like may be detected. The method of detecting the posture of the user 1 is not limited.

Moreover, the physical information acquisition unit 21 acquires a height of the user 1 as the physical information. Typically, the above-mentioned storage unit 15 or the like stores the height of the user 1 in advance, and the physical information acquisition unit 21 reads in the height of the user 1 as appropriate. Alternatively, the height of the user 1 may be estimated by monitoring a height position of the HMD 100 from the floor on the basis of a detection result of the rear-facing camera 16 or the like. The method of acquiring the height of the user 1 is not limited.

In addition, as the physical information, a motion state of the user 1, such as a walking state and a running state, may be acquired. The motion state of the user 1 can be detected on the basis of the outputs of the 9-axis sensor 17, the position sensor 18, and the biometric sensor 19. Alternatively, as the physical information, the age, the gender, and the like of the user 1 may be acquired. Such information specific to the user 1 is, for example, pre-stored in the storage unit 15 as user information, and the physical information acquisition unit 21 reads in it as appropriate. Each piece of physical information acquired by the physical information acquisition unit 21 is output to the determination condition setting unit 24, the layout calculation unit 26, and the like to be described later.

The gesture information acquisition unit 22 acquires gesture information regarding a gesture of the user. The gesture information is information for detecting the gesture of the user 1. Acceleration, angular velocity, direction, and the like output from the 9-axis sensor 17 are, for example, gesture information for detecting gestures of the user 1 using the head, gestures of the user 1 moving the entire body, and the like. Moreover, images or the like of the hands and legs of the user 1, which the rear-facing camera 16 has taken, are gesture information for detecting gestures using the hands, gestures using the legs, and the like. Moreover, images of the eyes of the user 1 are gesture information for detecting gestures of the eyes of the user 1. In addition, the types and the like of gesture information are not limited. For example, in a case where an external camera (not shown) that takes images of the user 1, for example, is provided separate from the HMD 100, images of the user 1 that the external camera has taken are gesture information. Each piece of gesture information acquired by the gesture information acquisition unit 22 is output to the gesture detection unit 25 to be described later.

The environmental information acquisition unit 23 acquires environmental information regarding the surrounding environment of the user 1. The environmental information includes, for example, image data of the surrounding environment, which the rear-facing camera 16 has taken, depth data, and the like. Moreover, the environmental information acquisition unit 23 performs processing such as the SLAM on the basis of the image data, depth data, and the like and generates a space map or the like of the surrounding environment of the user 1. This space map is environmental information indicating a position(s) or the like of a real object(s) in the surrounding environment of the user 1. Alternatively, for example, in a case where a space map or the like is pre-stored, the space map may be read in on the basis of the output (position information and the like) of the position sensor 18. Alternatively, on the basis of the space map or the like, detailed environmental information may be generated. For example, information indicating that the current position of the user 1 is indoor or outdoor, heights of the ceiling and floor, and the like are detected as the environmental information. It should be noted that the present technology is not limited to the case where the space map is used, and whether or not the user 1 is indoor or outdoor may be detected on the basis of the position information of the user 1, the image data of the rear-facing camera, and the like. In addition, the type and the like of the environmental information are not limited, and for example, brightness, temperature, and the like of the surrounding environment may be acquired as the environmental information. Each piece of environmental information acquired by the environmental information acquisition unit 23 is output to the determination condition setting unit 24, the layout calculation unit 26, and the like to be described later.

On the basis of the physical information, the determination condition setting unit 24 sets a determination condition for determining a trigger gesture that is a trigger for an operation input by a gesture of the user 1. In the operation input by the gesture (gesture operation), the user 1 performs a predetermined gesture to thereby perform operation processing corresponding to the gesture. The operation processing is started by detecting the predetermined gesture by the use of the sensor unit 14 or the like. Thus, in the gesture operation, a gesture of the user 1 him or herself functions as the trigger. The determination condition for determining this gesture (trigger gesture) that functions as the trigger is set on the basis of the physical information such as the posture and height of the user 1.

Physical Feature=Physical Feature Information

In this embodiment, the determination condition setting unit sets the determination condition on the basis of physical feature information of the user, which corresponds to the physical information. The physical feature information is, for example, information regarding physical feature of the user 1 in the physical state indicated by the physical information. For example, a human physical feature (human feature) includes features that change depending on a physical state (posture, height, age, gender, etc.). Therefore, it is conceivable that a range that the user 1 can visually recognize, the tendency of the gesture, and the like change depending on a change in the posture of the user 1 who uses the HMD 100, an individual difference of the user 1, and the like.

The physical feature information includes information regarding a field-of-view feature of the user in the physical state. For example, in a case where the user 1 is seated (seated state), the field-of-view (line-of-sight) tends to move downward as compared with a case where the user 1 is standing (standing state) (see FIG. 6). In this case, information indicating a field-of-view range in each posture is the physical feature information. Moreover, the physical feature information includes information regarding a motion feature of the user 1 in the physical state. For example, between the seated state and the standing state, a range in which the head, the body, and the like can move is different (see FIG. 11). In this case, information indicating a range in which motions are allowed in each posture is the physical feature information. In addition, in a case where the state such as the height, the age, and the gender is different, the physical feature such as the field-of-view range and the range in which motions are allowed is different. The determination condition setting unit 24 sets a determination condition of the trigger gesture in accordance with the physical feature information in the physical state such as the posture and the height acquired as the physical information.

Moreover, in this embodiment, the determination condition setting unit 24 sets the determination condition on the basis of the environmental information. For example, between the indoor and outdoor environments, a range of motions that the user 1 unconsciously performs, the line-of-sight, and the like are different. That is, in a case where the user 1 performs a certain gesture, the amount of motion (size of motion) in performing the gesture can differ depending on the surrounding environment. In addition, it is conceivable that the motion (gesture) of the user 1 changes depending on the surrounding environment. The determination condition setting unit 24 sets the determination condition of the trigger gesture in accordance with human physiological and physical features that occur in such an external environment factor.

In this embodiment, the determination condition includes a determination threshold for determining the trigger gesture. That is, in order to discriminate the trigger gesture from other gestures, threshold processing using the determination threshold is performed. The determination threshold is, for example, a threshold with respect to a parameter that changes when the trigger gesture is performed. For example, in a case where the trigger gesture is a gesture that changes the posture of the head, a threshold angle with respect to a posture angle of the head (HMD 100) is the determination threshold. Thus, a determination threshold corresponding to a trigger gesture that is a target is used for determining the trigger gesture. Alternatively, a plurality of determination thresholds may be used for determining a single trigger gesture. Setting processing of the determination threshold by the determination condition setting unit 24 will be described later in detail.

The gesture detection unit 25 detects a gesture of the user 1 on the basis of the gesture information acquired by the gesture information acquisition unit 22. For example, on the basis of the acceleration or the like of the HMD 100 that the sensor unit 14 has detected, a gesture (head gesture) of the user 1 changing the posture and position of the head or the like is detected. Moreover, a gesture (hand gesture) performed by the user 1 moving the hands or the like is detected from image data taken by the rear-facing camera 16, for example. The method of detecting a gesture is not limited, and for example, a motion recognition technology, an image recognition technology, and the like using the 9-axis sensor 17 may be used. Alternatively, gesture detection using machine learning or the like may be performed.

Moreover, the gesture detection unit 25 determines whether or not the user 1 has performed the trigger gesture. That is, the gesture detection unit 25 determines whether or not the gesture indicated by the gesture information of the user 1 (motion of the user 1) is the trigger gesture.

For determining the trigger gesture, the determination condition (determination threshold) set by the determination condition setting unit 24 is used. For example, it is assumed that a gesture of moving the head upward is set as the trigger gesture. In this case, whether or not the trigger gesture is performed is determined by determining whether or not the angle of tilt of the head of the user 1 exceeds the corresponding determination threshold (threshold angle). In this manner, on the basis of the gesture information and the determination condition, the gesture detection unit 25 determines whether or not the trigger gesture is performed. The use of the determination condition enables intended gestures and other motions of the user 1 to be distinguished from each other and detected.

The layout calculation unit 26 acquires data of a virtual image to be displayed on the display unit 10 (see-through display) and calculates a layout of the virtual image. For example, in a case where a trigger gesture made by the user 1 is detected, data of a virtual image corresponding to the trigger gesture is read in and a layout of the virtual image is calculated. That is, on the basis of the determination result of the trigger gesture, the layout calculation unit 26 controls the output of the virtual image corresponding to the trigger gesture. Moreover, in accordance with the progress of the content being executed in the HMD 100, the layout calculation unit 26 reads in the data of the virtual image and calculates a layout thereof.

The data of the virtual image is, for example, stored in the storage unit 15 as content information. Alternatively, the content information may be read in via the communication unit 12 or the layout calculation unit 26 may generate and edit the data of the virtual image. It should be noted that the number and the like of virtual images to be displayed on the display unit 10 are not limited. For example, there are a case where a single virtual image is displayed, a case where a plurality of virtual images is displayed at the same time, and the like, and necessary data of the virtual image(s) is each acquired.

As the layout of the virtual image, for example, layout parameters such as display position, size, and posture (tilt) of the virtual image are calculated. As will be described later, the virtual image includes an image to be displayed using a coordinate system (body coordinate system) using the user 1 as the basis, an image to be displayed using a coordinate system (space coordinate system) using the surrounding space (space map or the like) as the basis, and the like. The layout calculation unit 26 calculates each of the display position, size, etc. of the virtual image in each coordinate system in accordance with the posture, position, etc. of the HMD 100 (user 1), for example.

In this embodiment, the layout calculation unit 26 controls the display position of the virtual image on the basis of the physical information of the user 1. For example, as to a certain virtual image, after a display position corresponding to the posture and position of the HMD 100 (user 1) is calculated, a display position (coordinate position) of the virtual image is, in turn, adjusted in accordance with the posture, height, and the like of the user 1. Moreover, in this embodiment, the layout calculation unit 26 controls the display position of the virtual image on the basis of the environmental information. For example, the display position set on the basis of the physical information is adjusted in accordance with the presence/absence of a ceiling in the surrounding environment or the like.

The method of controlling the display position of the virtual image by the layout calculation unit 26 is not limited. For example, the display position may be adjusted using only one of the physical information or the environmental information or the display position may be adjusted using both the physical information and the environmental information as described above. It should be noted that along with the adjustment of the display position of the virtual image, other layout parameters such as the size and posture of the virtual image are adjusted so that the virtual image is properly displayed.

Moreover, as the method of displaying the virtual image, there can be exemplified a method of performing conflict determination between the space map and the virtual image (display object) and moving content, a GUI, or the like to an empty area of the real space. In this method, displaying can be performed so that a real object present in the real space and a virtual image do not unnaturally overlap each other. Accordingly, displaying can be performed as if the virtual image were floating in the real space. In addition to such display control, for example, the layout calculation unit 26 performs display control using the above-mentioned physical information and environmental information. Accordingly, user-friendly virtual experience having a high entertainment property can be realized. The specific kind of the virtual image and the control processing for the display position will be described later in detail.

The layout determination unit 27 determines the layout of the virtual image to be displayed on the display unit 10 in accordance with a degree-of-priority of the virtual image. For example, there is a case where a virtual image that is a display target is a display for emergency, such as an error message and a caution message, i.e., a display having a high degree-of-priority. In such a case, the layout determination unit 27 generates a command to display the virtual image that is the target with a high degree-of-priority and outputs it to the layout calculation unit 26. Accordingly, the virtual image for emergency or the like can be reliably displayed.

The output control unit 28 generates an image to be output that includes the virtual image displayed on the display unit 10. For example, on the basis of the layout parameters calculated by the layout calculation unit 26, an image to be output including one or more virtual images is generated. At that time, brightness, contrast, and the like may be adjusted. The generated image to be output is output to the display unit 10 and displayed in front of the eyes of the user 1. As a result, the user 1 wearing the HMD 100 can visually recognize the virtual image superimposed on the real space.

In this manner, in the HMD 100, the gesture detection unit 25, the layout calculation unit 26, the layout determination unit 27, and the output control unit 28 realize display control of the virtual image that is based on the gesture operation of the user 1 or the progress of the content. It should be noted that in a case where the trigger gesture is a trigger for a gesture operation for controlling audio output, vibration output, or the like, output corresponding to the trigger gesture is controlled. In this embodiment, the gesture detection unit 25, the layout calculation unit 26, the layout determination unit 27, and the output control unit 28 cooperate to thereby realize the control unit.

[Virtual Image]

Figure 3:
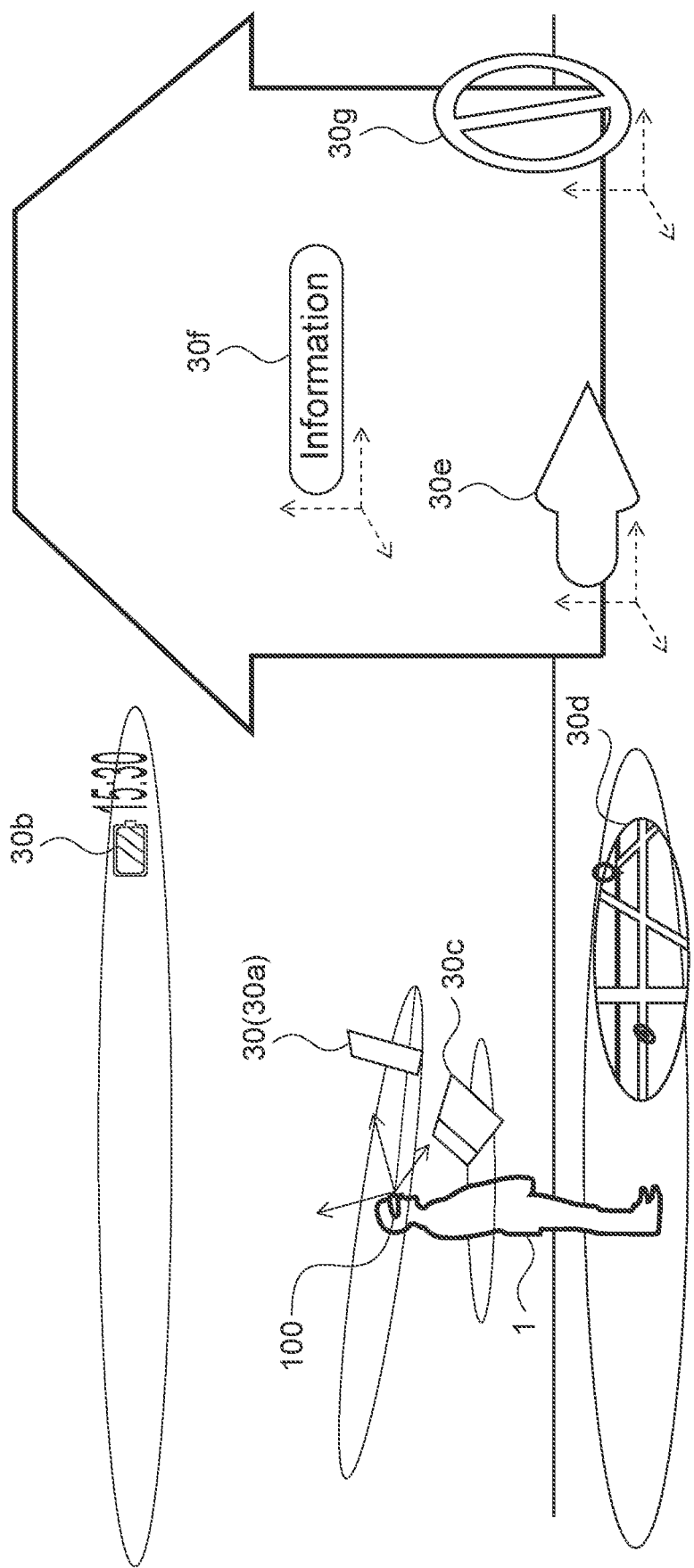
FIG. 3 A schematic diagram for describing an example of a virtual image.

FIG. 3 is a schematic diagram for describing an example of the virtual image. In the example shown in FIG. 3, the user 1 and a building are real objects that exist in the real space. Moreover, virtual images 30*a* to 30*g* are examples of virtual objects to be displayed to the user 1 wearing the HMD 100 so that the user 1 wearing the HMD 100 can visually recognize them. Those virtual objects (virtual images 30) function as graphical user interfaces (GUIs) that present various types of information to the user 1, for example. Hereinafter, virtual images to be displayed on the HMD 100 (display unit 10) will be specifically described with reference to FIG. 3.

The display positions of the virtual images 30 are set in accordance with one or both of a body coordinate system using the user 1 (HMD 100) as the basis and a space coordinate system using the real space (surrounding environment) where the user 1 is present as the basis. In FIG. 3, the body coordinate system and the space coordinate system are schematically shown with the solid-line arrow and the dotted-line arrows, respectively.

The body coordinate system is, for example, a coordinate system following position and posture of the HMD 100, i.e., position and posture of the head of the user 1. The space coordinate system is a coordinate system (world coordinate system) set in accordance with the space map or the like irrespective of the position and posture of the HMD 100 and the like. Thus, when the user 1 wearing the HMD 100 moves, the point-of-origin of the body coordinate system as viewed from the space coordinate system changes. Moreover, when the user 1 moves the head, the orientation of the body coordinate system as viewed from the space coordinate system changes.

The virtual image 30*a* is, for example, an image that is arranged using the body coordinate system as the basis and is displayed to fall within the field-of-view of the user 1 irrespective of the posture of the head of the user 1 and the like. For example, even when the user 1 moves the head, the user 1 can constantly visually recognize the virtual image 30*a*. The virtual image 30*a* is, for example, used for displaying main content, an error message, or the like.

The virtual image 30*b* is, for example, an image that is arranged using the body coordinate system and a vertical direction (upper-lower direction in the real space) as the basis and displayed on a diagonally upper side with respect to the user 1. For example, by using the current position of the user 1 as the basis, the virtual image 30*b* is arranged along an annular orbit set above the user 1. As shown in FIG. 3, when the user 1 in an upstanding posture moves the head upward, the virtual image 30*b* is displayed on the display unit 10. Moreover, when the user 1 looks forward again, the virtual image 30*b* gets out of the field-of-view (angle-of-view) of the user 1 and is not displayed. The virtual image 30*b* is, for example, used for displaying a current time, the remaining battery of the HMD 100, status information such as a communication status, a message, or the like. In this embodiment, the virtual image 30*b* corresponds to an upper image to be displayed on a diagonally upper side as viewed from the user.

The virtual image 30*c* is, for example, an image that is arranged using the body coordinate system as the basis and displayed in an area around the body (around the waist) of the user 1, i.e., a working space in which the user 1 can reach the hands. For example, in accordance with a selection operation (operation via a gesture or the operation input unit) of the user 1, a plurality of virtual images 30*c* is displayed centered at the abdomen of the user 1. The virtual images 30*c* are, for example, used for displaying an operation selection screen (launcher) and main content.

The virtual image 30*d* is, for example, an image that is arranged using the body coordinate system and the vertical direction as the basis and displayed near the feet of the user 1. Here, the virtual image 30*d* is displayed along the floor (ground) of the place where the user 1 is located. For example, the virtual image 30*d* is displayed to move along with the movement of the user 1. Therefore, the virtual image 30*d* is arranged using the position of the user 1 (body coordinate system) and the floor (space coordinate system) as the basis. The virtual image 30*d* is used for displaying a launcher, a navigation map, or the like. In this embodiment, the virtual image 30*d* corresponds to a lower image to be displayed on a diagonally lower side as viewed from the user.

The virtual image 30*e* is, for example, arranged using the position of the user 1 and the space coordinate system as the basis and localized and displayed in the real space so as to maintain a position relative to the user 1. For example, when the user 1 moves, the position of the virtual image 30*e* in the space coordinate system also changes, while even when the user 1 changes the orientation, the position of the virtual image 30*e* does not change. The virtual image 30*e* is, for example, used for displaying a navigation object (e.g., arrow, agent character) or the like.

The virtual image 30*f* is, for example, an image that is arranged using the space coordinate system as the basis and displayed at constantly the same size (field-of-view angle) irrespective of the distance from the user 1. The virtual image 30*f* is, for example, localized and displayed at a predetermined position of the space coordinate system. Both in a case where the display position of the virtual image 30*f* is close and a case where the display position of the virtual image 30*f* is far, the user 1 visually recognizes the virtual image 30*f* displayed with a similar size. The virtual image 30*f* is used for displaying, for example, an icon, a message, or the like that displays information set to a real object (e.g., item, store, place).

The virtual image 30*g* is, for example, an image that is arranged using the space coordinate system as the basis and displayed as if it were present in the real space. For example, as the distance between the display position of the virtual image 30*g* and the user 1 becomes shorter, the virtual image 30*g* is displayed to be larger. That is, the virtual image 30*g* is an image that displays a superimposed object (virtual object) fixed in the space coordinate system.

It should be noted that the above-mentioned virtual images 30*a* to 30*g* are merely examples, and for example, arbitrary virtual images 30 depending on content may be used. In addition, the kinds, applications, and the like of the virtual images 30 are not limited. Moreover, in arbitrary virtual images 30 having features as described above, the present technology can be applied.

Here, an example of display processing of the virtual image 30 that corresponds to a trigger gesture will be described. In the HMD 100, when a predetermined trigger gesture is detected, display processing of a virtual image 30 that corresponds to the detected trigger gesture is started. That is, the trigger gesture functions as a trigger for a display operation of causing the virtual image 30 to be displayed. Accordingly, only by performing a predetermined trigger gesture, the user 1 can cause a desired virtual image 30 to be displayed.

In this embodiment, by the user 1 moving the head upward, the virtual image 30*b* (e.g., status) is displayed on the diagonally upper side as viewed from the user 1. In this case, the trigger gesture is a head gesture of the user 1 moving the head upward. It should be noted that all gestures of the user 1 moving the head upward are not trigger gestures, and in a case where an angle or the like of the posture of the head of the user 1 exceeds a determination threshold, the head gesture is detected as the trigger gesture.

Moreover, by the user 1 moving the head downward, the virtual image 30*d* (e.g., navigation map) is displayed on the diagonally lower side as viewed from the user. In this case, the trigger gesture is a head gesture of the user 1 moving the head downward. It should be noted that processing of displaying the virtual image 30*c* instead of the virtual image 30*d* or processing of determining a posture angle of the head and displaying each of the virtual images 30*c* and 30*d* can also be performed. In addition, the types and the like of gestures that are triggers for display operations are not limited, and the display operations may be performed in accordance with gestures of rotating the head leftward and rightward, gestures of moving the arms or legs, or the like.

Alternatively, the trigger gesture may be a trigger for a non-display operation of causing the virtual image 30 not to be displayed. For example, the above-mentioned head gesture of the user 1 moving the head upward may enable a gesture operation to hide the virtual image 30 (e.g., virtual image 30*a* shown in FIG. 4) displayed in front of the eyes of the user 1 to be performed. Alternatively, the head gesture of the user 1 moving the head downward may function as the trigger for the non-display operation. As described above, the present technology can also be applied in a case where the trigger for the non-display operation is used.

[Basic Operation of HMD]

Figure 4:
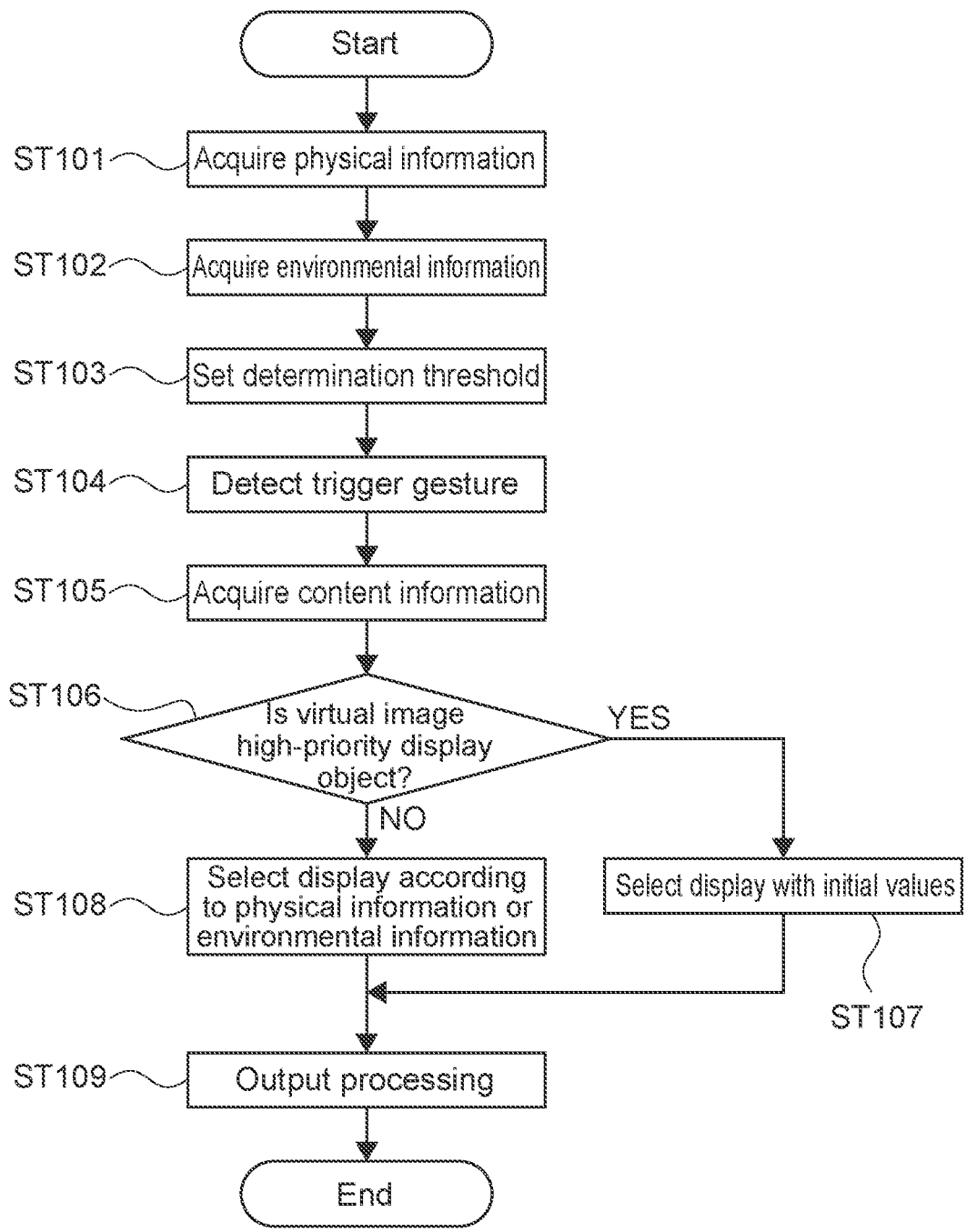
FIG. 4 A flowchart showing an example of a basic operation of the HMD.

FIG. 4 is a flowchart showing an example of a basic operation of the HMD 100. The flowchart shown in FIG. 4 is, for example, processing performed repeatedly when the HMD 100 is in the on-state. Hereinafter, taking a case where the user 1 performs a gesture operation (display operation)

to operate display/non-display of the virtual image 30 as an example, the basic operation of the HMD 100 will be described.

First of all, the physical information acquisition unit 21 acquires physical information of the user 1 (Step 101). For example, on the basis of the output of the 9-axis sensor 17 or the like, a body posture (e.g., standing state, seated state), a head posture, a limb state, and the like of the user 1 are detected. Alternatively, for example, user information (height, gender, age, and the like) stored in the storage unit 15 is read in.

The environmental information acquisition unit 23 acquires environmental information of the surrounding environment of the user 1 (Step 102). For example, depth information (depth data) of the periphery, an environment shape, a space map, and the like are read in. Moreover, object recognition processing with respect to a real object(s) present in the surrounding environment is performed, and for example, information regarding the presence/absence of a ceiling at a current position of the user 1, heights of ceiling and floor, and the like are acquired. Alternatively, for example, on the basis of a processing result of the object recognition processing, the presence/absence of a moving object(s) and the like are detected as the environmental information. As described above, it can also be said that the environmental information is information indicating a recognition result of the external environment.

The determination condition setting unit 24 sets a determination condition (determination threshold) for determining the trigger gesture (Step 103). The determination condition is set on the basis of the physical information acquired in the above-mentioned step. For example, the determination condition appropriate to physical feature information in a posture state (seated state or standing state) of the user 1 is set. Moreover, a threshold may be set on the basis of the environmental information. The determination condition is changed, for example, depending on the presence/absence of the ceiling or the like. This point will be specifically described later. It should be noted that in a case where a plurality of trigger gestures is set, determination conditions corresponding to the respective trigger gestures are each set on the basis of the physical information or the environmental information.

Using the determination condition set in Step 103, the trigger gesture is detected (Step 104). First of all, the gesture information acquisition unit 22 acquires gesture information (e.g., acceleration, angular velocity, and direction and the like of the HMD 100). Then, the gesture detection unit 25 determines whether or not the gesture indicated by the gesture information is the trigger gesture, using the determination condition.

For example, a threshold angle with respect to a posture angle (e.g., pitch angle to be described later) of the head (HMD 100) is used as the determination condition of the trigger gesture of moving the head. In this case, the gesture detection unit 25 determines whether or not the posture angle of the head is larger than the threshold angle. In a case where the posture angle is larger than the threshold angle, it is determined that the trigger gesture is performed. In a case where the posture angle is smaller than the threshold angle, it is determined that the trigger gesture is not performed. This determination result (i.e., detection result of the trigger gesture) is output to the layout calculation unit 26.

The layout calculation unit 26 acquires content information for displaying virtual images 30 (Step 105). Specifically, image data of virtual images 30 to be arranged in the content being executed in the HMD 100 is read in as the content information. Moreover, layout parameters of the position and size and the like of each virtual image 30 are calculated as the content information.

For example, in Step 104, in a case where a trigger gesture for a display operation of causing a virtual image 30 to be displayed is detected, content information (data of the virtual image 30) corresponding to the trigger gesture is read in. It should be noted that in a case where the trigger gesture is not detected, processing related to the display operation (reading the content information or the like) is not performed. Moreover, in a case where other content or the like is being executed, content information regarding the content is acquired as appropriate.

Moreover, the posture and position of the head of the user 1 (HMD 100) are detected, and the layout parameters of the virtual images 30 are calculated in accordance with the detection result. For example, display positions, the sizes, and the like of a character, a message, and the like included in the field-of-view of the user 1 are calculated as appropriate. It should be noted that in Step 105, for example, layout parameters on which the physical feature of the user 1 and the like are not reflected are calculated. As will be described later, those layout parameters can be adjusted on the basis of the physical information and the environmental information.

The layout determination unit 27 determines whether or not the virtual image 30 is a display object set to have a high degree-of-priority (high-priority display object) (Step 106). Here, for example, the degrees-of-priority of the respective virtual images 30 (content information) acquired in Step 105 are each determined. For example, a high degree-of-priority is set to a virtual image 30 that presents emergency information such as an error message and a caution message. In contrast, a low degree-of-priority is set to a normal virtual image 30 that displays a status, a menu screen, or the like. Alternatively, the degree-of-priority may be set only to the virtual image 30 for emergency and the degree-of-priority does not need to be set to the normal virtual image 30.

In a case where it is determined that the virtual image 30 has a high degree-of-priority (YES in Step 106), display with initial values is selected (Step 107). For example, a command signal indicating that the virtual image 30 having a high degree-of-priority is to be displayed with pre-set layout parameters is generated. Accordingly, it is possible to, for example, constantly display the virtual image 30 having a high degree-of-priority in the middle of the field-of-view of the user 1 or the like, and an urgent message or the like can be reliably presented to the user 1.

In a case where it is determined that the virtual image 30 has a low degree-of-priority (NO in Step 106), display corresponding to the physical information or the environmental information is selected (Step 108). For example, a command signal indicating that the virtual image 30 having a low degree-of-priority is to be displayed with layout parameters adjusted in accordance with the physical information or the environmental information is generated. That is, as to the virtual image 30 having a low degree-of-priority, processing of controlling the display position in accordance with the posture of the user 1, the presence/absence of the ceiling in the space where the user 1 is present, or the like is selected. Accordingly, for example, it is possible to display the virtual image 30 at a position easy for the user 1 to visually recognize, and a user-friendly GUI can be realized.

In this manner, in accordance with the degree-of-priority of the virtual image 30 (GUI or the like) to be presented to the user 1, whether to perform displaying in view of the physical feature is determined. For example, there can be a case where it is unfavorable to adjust the display position and the like of the virtual image 30 having a high degree-of-priority like the above-mentioned error message or the like. In this embodiment, by performing the determination processing in Step 106, virtual images 30 whose display positions should be adjusted and virtual images 30 that should be displayed without changing the positions can be distinguished from each other and processed. Accordingly, the HMD 100 easy to use and highly reliable can be realized.

In accordance with the display method selected in Steps 107 and 108, output processing of the virtual images 30 is performed (Step 109). First of all, the layout calculation unit 26 adjusts the layout parameters for each virtual image 30. As to the virtual image 30 having a low degree-of-priority, the display position is adjusted in accordance with the physical information or the environmental information. As to the virtual image 30 having a high degree-of-priority, a default display position is set. Then, the output control unit 28 generates an image to be output on the basis of the layout parameters of the virtual images 30 and outputs it to the display unit 10. In this manner, in the HMD 100, the virtual images 30 such as GUIs are displayed on the basis of the determination conditions and the display positions set in accordance with the physical information and the environmental information.

[Threshold Setting and Display Control]

Hereinafter, taking a gesture operation by a head gesture of the user 1 moving the head upward (hereinafter, referred to as upward gesture) as an example, setting processing of the determination condition (determination threshold) and display control of the virtual image 30 will be described specifically. It should be noted that as described above with reference to FIG. 3, the upward gesture functions as the trigger gesture for the display operation of causing a predetermined virtual image 30 (virtual image 30b) to be displayed.

First of all, the posture angle of the head will be described. The posture angle of the head is, for example, represented by a pitch angle, a roll angle, and a yaw angle. Those posture angles are, for example, angles using a horizontal plane and a vertical direction as the basis.

The pitch angle is an angle using a left-right direction of the head as the rotational axis, and represents, for example, an angle of tilt (flex angle or extension angle) of the head when the neck is tilted forward or rearward. The roll angle is an angle using a front-back direction of the head as the rotational axis, and represents, for example, an angle of tilt of the head (lateral flex angle) when the neck is tilted leftward or rightward. The yaw angle is an angle having an upper-lower direction of the head as the rotational axis, and represents, for example, an angle of rotation (rotational angle) of the head when the neck is rotated leftward or rightward. It should be noted that other than the case of moving the neck, for example, when the user 1 bends the upper part of the body forward or backward, leftward or rightward, the pitch angle and the roll angle change, and when the user 1 rotates the upper part of the body, the yaw angle changes.

In this embodiment, the posture angle of the head of the user 1 is represented by the posture angle (e.g., pitch angle, roll angle, yaw angle) of the HMD 100. The posture angle of the HMD 100 is, for example, detected on the basis of the output of the 3-axis gyro sensor or the like. It should be noted that in a case where the external camera or the like is provided, the posture angle of the head may be directly estimated by performing skeleton estimation or the like on the basis of a taken image of the user 1. In addition, the method of calculating the posture angle of the head and the like are not limited. Hereinafter, it is assumed that a state (reference posture) in which the head of the user 1 faces forward, each posture angle is 0°. Moreover, the posture angle of the HMD 100 may be referred to as the posture angle of the head.

In a case where the upward gesture is performed, the pitch angle of the head (HMD 100) changes upward due to the user 1 moving the head upward. A threshold angle (upper threshold angle) with respect to this pitch angle that changes upward is set as the determination condition for determining the upward gesture as the trigger gesture. That is, the determination condition for the upward gesture includes the upper threshold angle with respect to the pitch angle of the head of the user 1 that changes due to the upward gesture. It should be noted that the upper threshold angle is, for example, set as an angle using the pitch angle=0° as the basis.

For example, in a case where the pitch angle does not exceed the upper threshold angle in the motion of the user 1 moving the head upward, it is determined that the trigger gesture is not performed. Otherwise, in a case where a motion with the pitch angle exceeding the upper threshold angle is performed, the motion (upward gesture) of the user 1 is determined as the trigger gesture. Then, in a case where it is determined that the trigger gesture is performed, the virtual image 30 is displayed on the diagonally upper side of the user 1.

Figure 5:
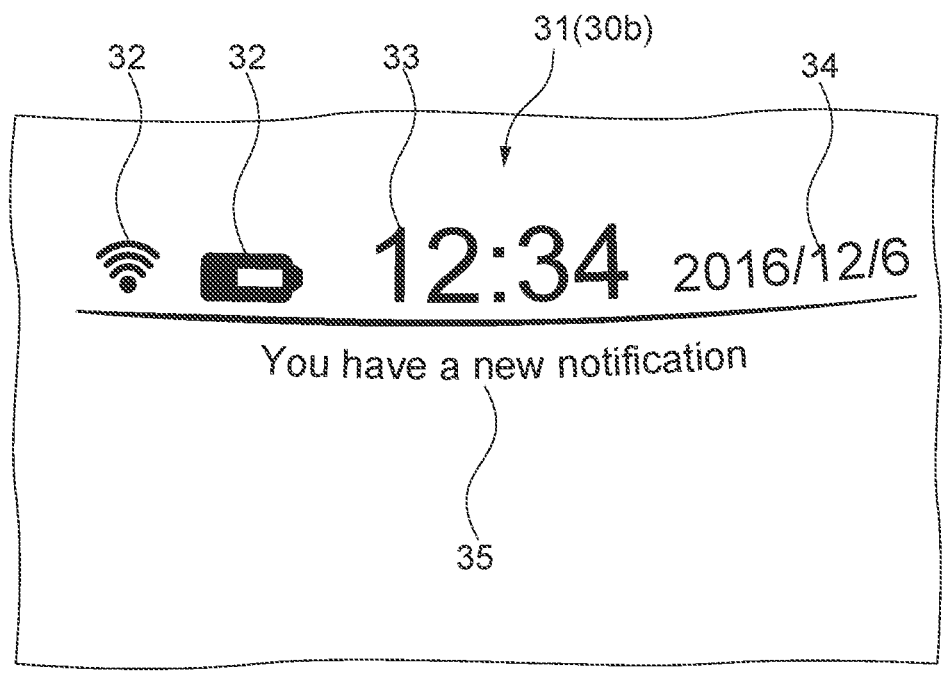
FIG. 5 A schematic diagram showing an example of a virtual image displayed by an upward gesture.

FIG. 5 is a schematic diagram showing an example of the virtual image 30 displayed by the upward gesture. FIG. 5 schematically shows an example of the virtual image 30 (upper image 31) displayed on the diagonally upper side of the user 1 by the user 1 performing the upward gesture. It should be noted that the upper image 31 is a specific display example of the virtual image 30b described above with reference to FIG. 3.

As shown in FIG. 5, the upper image 31 includes, for example, a status icon 32, a time display 33, a date display 34, and a message notification 35. The status icon 32 includes an icon showing a communication status of the HMD 100 (e.g., connection status with the network such as Wi-Fi), an icon showing the remaining battery of the HMD 100, and the like. The time display 33 and the date display 34 display current time and date. The message notification 35 is a text notification that notifies newly arrived e-mail, notifications, and the like. In addition, the specific displayed contents of the upper image 31 are not limited.

When the user 1 who uses the HMD 100 looks forward, the upper image 31 as shown in FIG. 5 is not displayed, and therefore a wider field-of-view is ensured. For example, for checking the status and the like, the user 1 moves the head upward by some angle (upper threshold angle), to thereby start display processing of the upper image 31 and present the status or the like. Moreover, the upper image 31 is localized and arranged above the user 1, and therefore when the user 1 looks forward again, it is not displayed. It should be noted that the upper image 31 is retained as active content for a certain time. Thus, when the user 1 moves the head upward while the upper image 31 is active, the upper image 31 is displayed irrespective of the upward gesture determination and the like.

[Features of Vertical Field-of-View]

Figure 6:
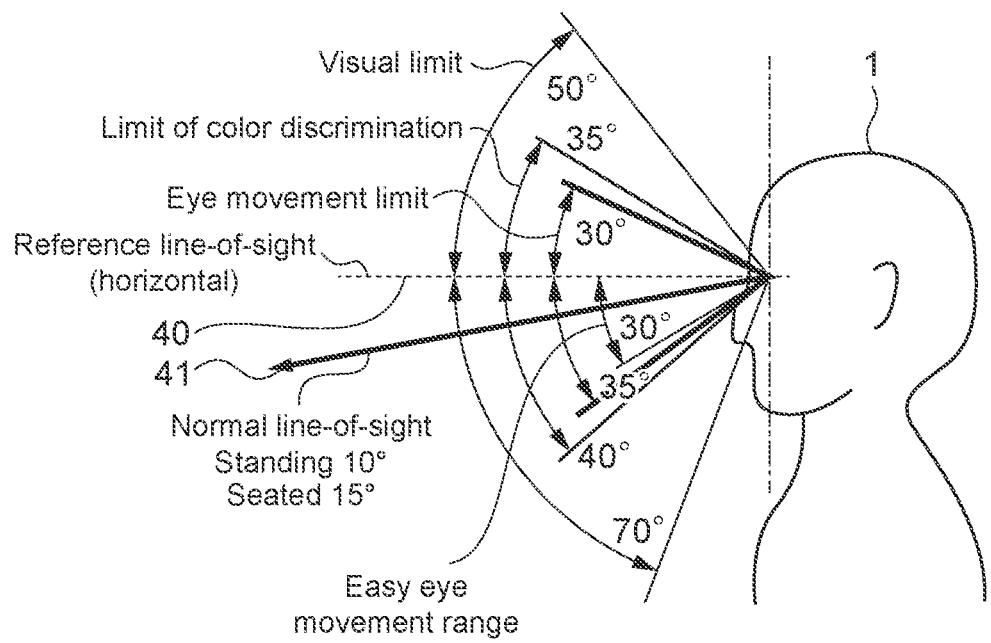
FIG. 6 A schematic diagram showing an example of features relating to a human vertical field-of-view.

FIG. 6 is a schematic diagram showing an example of features relating to a human vertical field-of-view. FIG. 6 has angles (angle ranges) showing respective features of the vertical field-of-view using a case where the human head faces forward as the basis. Each of the features shown in FIG. 6 is represented by an angle using, as the basis, a line-of-sight direction (reference line-of-sight 40) when a person looks in the horizontal direction in the state in which the human head faces forward.

A vertical movement limit of the human eye, i.e., a vertical maximum eye movement range is about 30° on the upper side and about 35° on the lower side. Moreover, a range in which the person can easily move the eyes is a range of about 30° on the lower side of the reference line-of-sight 40. The maximum eye movement range is a variable range in which the person can change the line-of-sight direction without changing the orientation of the head and the like. An easy eye movement range is a range in which the person can easily change the line-of-sight direction.

The field-of-view when the human line-of-sight is the reference line-of-sight 40 (when the person looks in the horizontal direction) is about 50° on the upper side and about 70° on the lower side. In this field-of-view, a range (limit of color discrimination) in which the person can discriminate the color is about 35° on the upper side and about 40° on the lower side. It should be noted that the field-of-view range and the limit of color discrimination change in accordance with the line-of-sight direction (eye orientation).

Moreover, in FIG. 6, a human normal line-of-sight direction (normal line-of-sight 41) is shown. In general, the normal line-of-sight 41 changes depending on the human posture. For example, in a seated state in which the person is seated, the normal line-of-sight 41 is a direction of about 15° on the lower side of the reference line-of-sight 40. Moreover, in a standing state in which the person is standing, the normal line-of-sight 41 is a direction of about 10° on the lower side of the reference line-of-sight 40. Thus, in the seated state, the direction (normal line-of-sight 41) in which the person normally looks is lower than that in the standing state by about 5°.

In this manner, the normal line-of-sight 41 of the user 1 (person), i.e., a range that the user 1 normally visually recognizes changes depending on the posture of the user 1. In this embodiment, in accordance with such a field-of-view feature in the posture of the user 1, the determination condition (the upper threshold angle of the upward gesture) is set.

[Threshold Setting According to Posture]

Figure 7A:
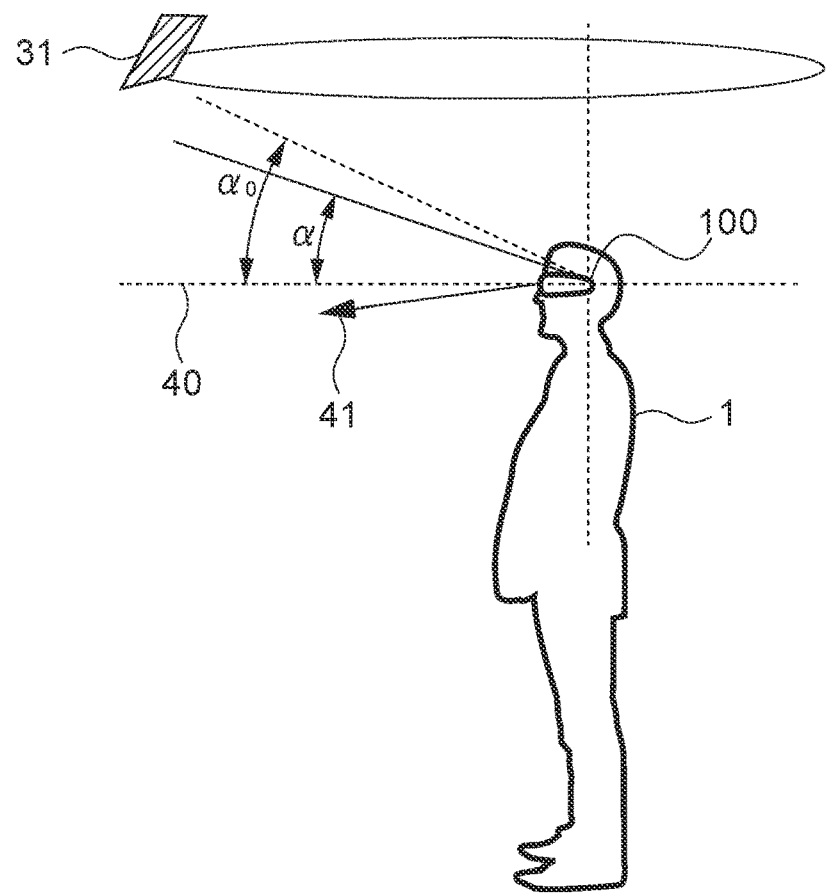
FIGS. 7A and 7B Schematic diagrams for describing setting of a determination threshold appropriate to a posture of a user.
Figure 7B:
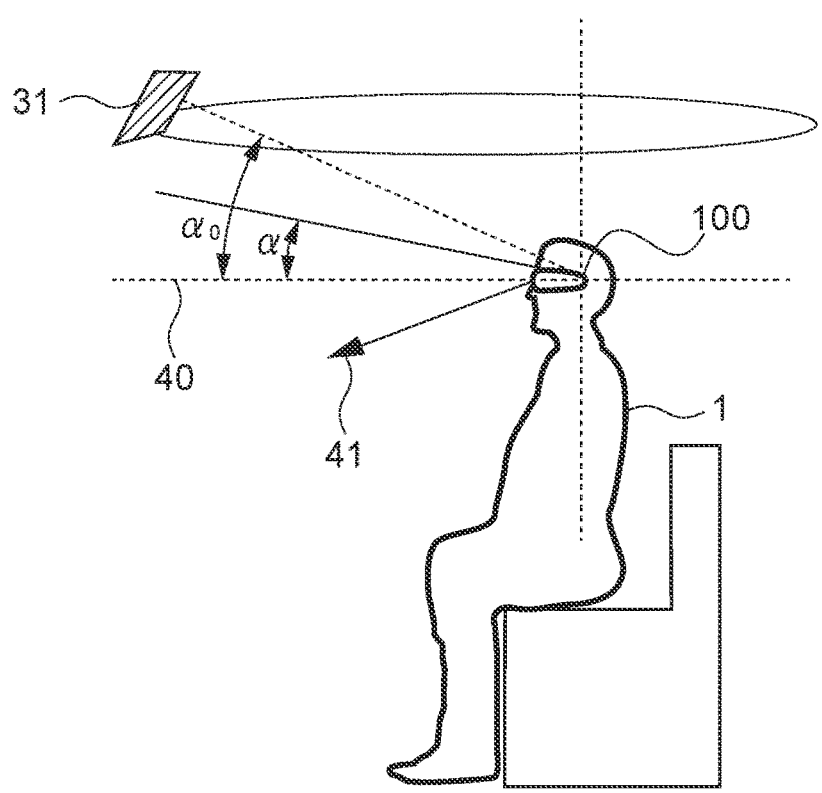

FIGS. 7A and 7B are schematic diagrams for describing setting of the determination condition appropriate to the posture of the user 1. In this embodiment, the determination condition setting unit 24 sets the determination condition in accordance with the posture of the user 1. For example, the posture information indicating whether or the user 1 is in the seated state or the standing state is acquired in Step 101 of FIG. 4. Then, the upper threshold angle that is the determination condition for the upward gesture is set using the posture information in Step 103. FIG. 7A and FIG. 7B schematically show the user 1 in the standing state and the user 1 in the seated state, respectively.

An upper-limit threshold angle $\alpha$ for determining the upward gesture is, for example, set in accordance with the posture of the user 1 by using a pre-set reference threshold angle $\alpha_0$ as the basis. This reference threshold angle $\alpha_0$ is, for example, a threshold angle set by using, as the basis, the state (state of the reference line-of-sight 40) in which the user 1 looks in the horizontal direction.

For example, the reference threshold angle $\alpha_0$ is set to be a maximum value of 30° on the upper side that is the movement limit of the eye shown in FIG. 6 ($\alpha_0=30°$). It corresponds to the upper-limit angle in the vertical direction at which the user 1 in the reference posture can gaze by moving the eyes without moving the head. That is, it can also be said that a minimum pitch angle that the user 1 moves in order to capture, in the front, a display object, at which the user 1 cannot gaze even by moving the eyes, is set as the reference threshold angle $\alpha_0$. The method of setting the reference threshold angle $\alpha_0$ is not limited, and for example, the reference threshold angle $\alpha_0$ may be set in accordance with the limit of color discrimination, the visual limit, or the like.

In this embodiment, the upper threshold angle is set by subtracting the angle $\theta$ of the normal line-of-sight 41 in the posture of the user 1 from the reference threshold angle $\alpha_0$. That is, the upper threshold angle $\alpha$ is set to $\alpha=\alpha_0-\theta$. For example, as shown in FIG. 7A, when the user 1 is in the standing state, the upper threshold angle is set to $\alpha=\alpha_0-10°$. Moreover, as shown in FIG. 7B, when the user 1 is in the seated state, the upper threshold angle is set $\alpha=\alpha_0-15°$. For example, where $\alpha_0=30°$, the upper threshold angle is set to $\alpha=20°$ in the standing state and the upper threshold angle is set to $\alpha=15°$ in the seated state. In this manner, the determination condition setting unit 24 sets, in a case where the seated state is detected, the threshold angle to be a smaller value than in a case where the standing state is detected.

For example, in the state in which the user 1 is seated, an average line-of-sight (normal line-of-sight) of the user 1 is directed closer (lower) as compared with the standing state. Therefore, it is conceivable that even when the user 1 has intended to perform a similar gesture in a case of performing the display operation by the upward gesture, the pitch angle in moving the head upward is smaller in the seated state than in the standing state unconsciously.

In contrast, in this embodiment, by setting the upper threshold angle $\alpha$ in the seated state to be lower than in the standing state, the user 1 can display the upper image 31 by a natural motion irrespective of the posture of the user 1. Moreover, in the standing state, the upper threshold angle $\alpha$ is set to be larger than in the seated state, and therefore determination errors and the like due to the fact that the pitch angle in performing the upward gesture is relatively larger can be reduced. Accordingly, operability of virtual experience using gesture operations and the like can be sufficiently improved.

It should be noted that the determination condition of the head gesture of the user 1 moving the head downward (hereinafter, referred to as downward gesture) may be set utilizing the difference of the normal line-of-sight 41 that depends on the posture of the user 1. For example, the downward gesture functions as a trigger gesture for displaying the virtual image 30d (lower image) shown in FIG. 3. As the determination condition of this downward gesture, a lower threshold angle $\beta$ with respect to the pitch angle that changes downward is set.

The determination condition setting unit 24 sets the lower threshold angle $\beta$ by, for example, subtracting the angle of the normal line-of-sight in the seated state or the standing state from a reference threshold angle $\beta_0$. The reference threshold angle $\beta_0$ is, for example, set to be a maximum value of 35° that is the movement limit of the eye on the lower side or the like. Accordingly, irrespective of the posture of the user 1, the user 1 can display the lower image by a natural motion. For example, as described above, the determination condition may be set.

[Display Control According to Posture]

Moreover, in this embodiment, the layout calculation unit 26 controls the display positions of the virtual images 30 in accordance with the posture of the user 1. For example, the vertical display position of the upper image 31 to be displayed in accordance with the upward gesture is adjusted in accordance with the posture (standing state or seated state) of the user 1. In FIG. 7A and FIG. 7B, the upper images 31 displayed when the user 1 is in the standing state and when the user 1 is in the seated state are schematically shown as the hashed regions.

The upper image 31 is arranged to fall within the field-of-view of the user 1 in a state in which the pitch angle of the head of the user 1 has reached the upper threshold angle α, for example. For example, the display position of the upper image 31 is adjusted so that the upper image 31 is displayed in a predetermined region within the field-of-view inclined at the upper threshold angle α (e.g., a region of the upper half of the field-of-view or the like). In this case, as long as the posture of the user 1 is not changed and the pitch angle is the same, the upper image 31 is displayed in a constant position within the field-of-view of the user 1. It should be noted that when the posture of the user 1 is changed, the display position of the upper image 31 (height position or the like as viewed from the head) differs.

For example, as shown in FIG. 7A, in the standing state, in accordance with the upper threshold angle α set to be larger than in the seated state, the upper image 31 is arranged at a relatively high position as viewed from the head of the user 1. Moreover, as shown in FIG. 7B, in the seated state, the upper threshold angle α is set to be a smaller value than in the standing state, and therefore the upper image 31 is arranged at a lower position in the standing state as viewed from the head of the user 1. In this manner, the layout calculation unit 26 sets the display position of the upper image 31 to be a lower position in a case where the seated state is detected than in a case where the standing state is detected.

Accordingly, irrespective of the posture of the user 1, the user 1 can visually recognize the upper image 31 smoothly as the extension of the upward gesture. Moreover, a gesture that the standing user performs can have, for example, an amount of motion larger than in the case where the user is seated or the like. In such a case, the upper image 31 can be displayed at a suitable position corresponding to the amount of motion of the user 1. Moreover, the seated user 1 can display the upper image 31 by an upward gesture having a small amount of motion and can easily visually recognize the upper image 31 displayed at a relatively low position at the same time.

It should be noted that the method of setting the display position of the upper image 31 is not limited. For example, for a case where the user 1 is standing and a case where the user 1 is seated, positions easy for the user 1 to visually recognize may be pre-set as default positions and the upper image 31 may be arranged at each default position in each posture of the user 1. Moreover, other than the display position, other layout parameters such as the size and posture of the upper image 31 may be adjusted in accordance with the posture.

[Threshold Setting According to Environmental Information]

Hereinabove, the setting of the determination condition and the like appropriate to the posture of the user 1 have been described. In the HMD 100, the determination condition setting unit 24 sets the determination condition on the basis of the environmental information. Accordingly, for example, the determination condition appropriate to the physical feature information in the surrounding environment in addition to the physical feature information in the posture state of the user 1 can be set.

The normal line-of-sight 41 (average line-of-sight) described above with reference to FIG. 6 can change depending on the surrounding environment of the person. For example, in a case where the person is outdoor, the normal line-of-sight 41 tends to be closer to the horizontal direction as compared with a case where the person is indoor. Moreover, even in the case where the person is indoor, as the ceiling is at a higher level, the normal line-of-sight 41 tends to be closer to the horizontal direction. Hereinafter, an angle of change of the normal line-of-sight 41 that changes depending on the environment will be referred to as an environment angle φ. The environment angle β is, for example, is an angle of 10° or less, and changes depending on the height of the ceiling and the like.

For example, it is assumed that the normal line-of-sight 41 in a case where the user 1 is indoor in the standing state is 10°. In a case where this user 1 is outdoor in the standing state, the normal line-of-sight 41 tends to be higher (e.g., 5° or the like). In this case, assuming that the feature of the normal line-of-sight 41 shown in FIG. 6 is a reference value, the environment angle φ in the indoor environment is 0° and the environment angle φ in the outdoor environment is 5°. It should be noted that in a case where the normal line-of-sight 41 is lower than the reference value, for example, the environment angle φ can also take a negative value. In practice, the environment angle φ is set on the basis of the normal lines-of-sight 41 and the like actually measured in the indoor environment and outdoor. Alternatively, the environment angle φ may be set by learning the motion tendence of the user 1.

In the HMD 100, the upper threshold angle for determining the upward gesture is adjusted in accordance with the feature difference of the human vertical field-of-view (change in the environment angle φ) due to such a difference of the surrounding environment. Hereinafter, the upper threshold angle set in accordance with the surrounding environment will be referred to as an upper threshold angle α'.

First of all, the environmental information regarding the surrounding environment of the user 1 is acquired (in Step 102 of FIG. 4). In this embodiment, the environmental information acquisition unit 23 detects the presence/absence of the ceiling in the surrounding environment. The presence/absence of the ceiling is, for example, detected on the basis of a space map generated by the use of the SLAM or the like and an image taken by the rear-facing camera 16. The detection result of the presence/absence of the ceiling is output to the determination condition setting unit 24. Then, upper threshold angles α' depending on the surrounding environments respectively are calculated for a case where the ceiling is present and a case where the ceiling is absent.

In the determination condition setting unit 24, for example, by adding the environment angle □ to the upper threshold angle depending on the posture of the user 1 (standing state or seated state), which has been described above with reference to FIGS. 7A and 7B, the upper threshold angle □' depending on the surrounding environment is calculated (□'=□+□). It corresponds to, for example, subtracting the angle of the normal line-of-sight 41 in each posture in the indoor environment or the outdoor environment from the reference threshold angle □0, which has been described above.

For example, in a case where the ceiling is detected, considering that the user 1 is indoor, the upper threshold angle α' depending on the surrounding environment is set to be the value obtained by adding the environment angle φ (e.g., 0°) in the indoor environment to the upper threshold angle α depending on the posture. On the other hand, in a case where the ceiling is not detected, considering that the user 1 is outdoor, the upper threshold angle α' is set to be the value obtained by adding the environment angle φ (e.g., 5°) in the outdoor environment to the upper threshold angle α.

In this manner, the determination condition setting unit 24 sets, in a case where the ceiling is detected, the upper threshold angle α' to be a smaller value than in a case where the ceiling is not detected. Accordingly, both in the case where the current position is indoor and in the case where the current position is outdoor, the user 1 can easily display the upper image 31 by naturally performing the upward gesture. As a result, the HMD 100 that provides excellent operability in various fields can be realized.

It should be noted that as described above, the present technology is not limited to the case where the upper threshold angle α' is set in accordance with the presence/absence of the ceiling, and for example, the upper threshold angle α' may be set in accordance with the height of the ceiling. For example, as the height of the ceiling becomes higher, the human normal line-of-sight 41 tends to be closer to the horizontal direction. In accordance with such a feature, for example, as the height of the ceiling becomes higher, the upper threshold angle α' is set to be larger. Accordingly, the gesture determination based on the field-of-view feature that changes depending on the difference of the height of the ceiling can be performed, and the operability can be improved.

Figure 8A:
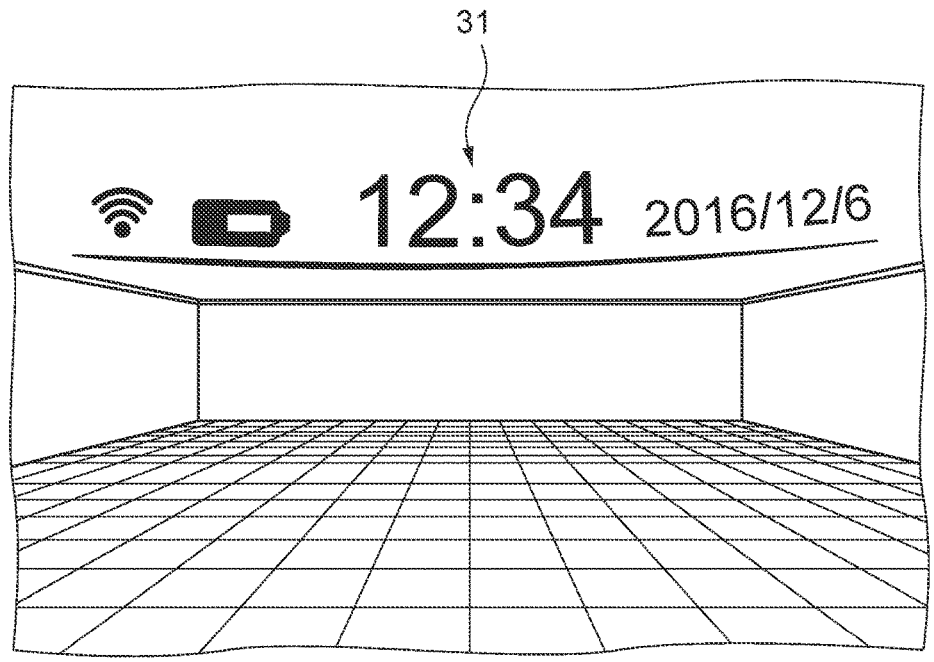
FIGS. 8A and 8B Schematic diagrams showing a display example of an upper image corresponding to the environmental information.
Figure 8B:
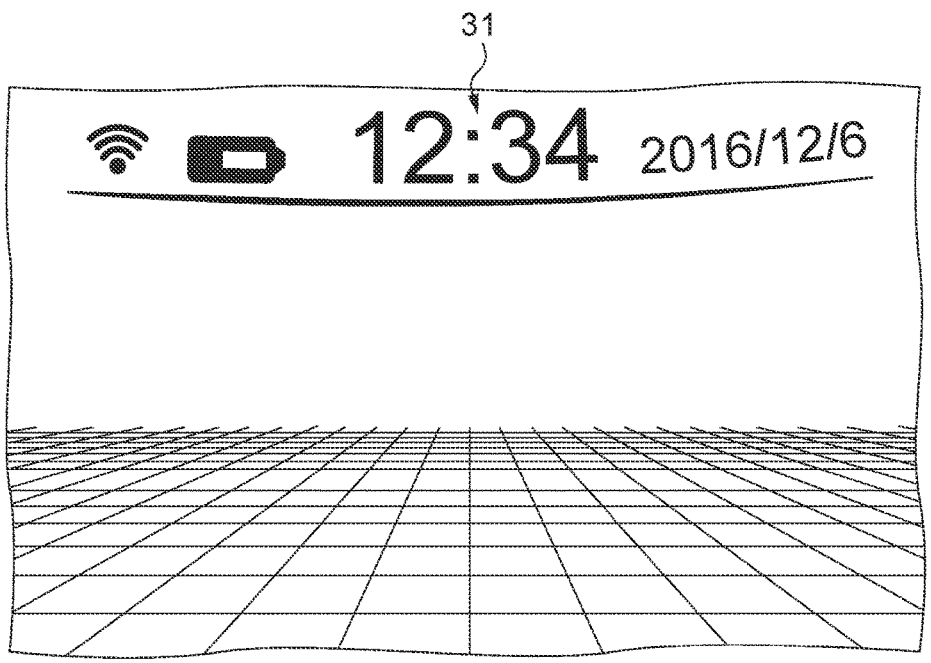

[Display Control According to Environmental Information] FIGS. 8A and 8B are schematic diagrams showing a display example of the upper image 31 corresponding to the environmental information. In FIGS. 8A and 8B, in the indoor environment where the ceiling is present and the outdoor environment where the ceiling is absent, the upper images 31 superimposed on the field-of-view of the user 1 are schematically shown. It should be noted that the field-of-view of the user 1 shown in FIGS. 8A and 8B is a field-of-view with the same posture of the user 1, the same height of the head from the floor, and the same pitch angle.

In this embodiment, the layout calculation unit 26 adjusts the display position of the upper image 31 in accordance with the presence/absence of the ceiling. For example, in a case where the user 1 is indoor (FIG. 8A), the upper image 31 is displayed at a lower position as compared with a case where the user 1 is outdoor (FIG. 8B). Those display positions can be set by using, for example, the upper threshold angles α' in the indoor and outdoor environments as the basis. Accordingly, the user 1 can visually recognize the upper image 31 smoothly as the extension of the upward gesture irrespective of the indoor/outdoor environment.

In the indoor environment, a target of interest of the user 1 is often in a space between the floor and the ceiling. Thus, even in a case where the display position of the upper image 31 is slightly lower as shown in FIG. 8A, the situation where the upper image 31 overlap a region at which the user 1 wishes to gaze can be sufficiently avoided. Moreover, the status and the like of the upper image 31 can be checked without tilting the head unnecessarily, and therefore the burden on the body of the user 1 can be reduced.

Moreover, in the outdoor environment, the user 1 can direct the line-of-sight to a further position. Therefore, as shown in FIG. 8B, by setting the display position of the upper image 31 to be higher, the field-of-view of the user 1 can be widely ensured, and the visibility to the real space can be increased. Moreover, the user 1 located in the outdoor environment can naturally perform even a relatively large motion. Therefore, even in a case where the display position of the upper image 31 is slightly higher, the user 1 can visually recognize the upper image 31 easily by a natural motion.

[Features of Horizontal Field-of-View]

Figure 9:
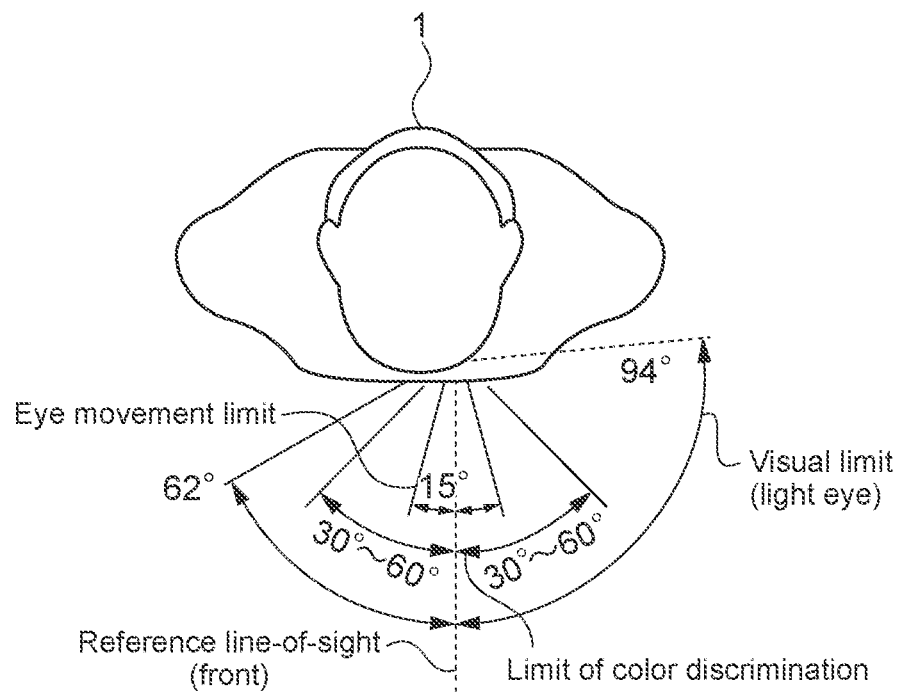
FIG. 9 A schematic diagram showing an example of features relating to a human horizontal field-of-view.

FIG. 9 is a schematic diagram showing an example of features relating to a human horizontal field-of-view. FIG. 9 schematically shows a person as viewed from the top of the head. FIG. 9 has angles (angle ranges) showing respective features of the horizontal field-of-view using a case where the human head faces forward as the basis. The lower side in the figure corresponds to the front of the user 1 and the upper side is equivalent to the back of the user 1.

A horizontal movement limit of the human eye, i.e., a horizontal maximum eye movement range are about 15° on the left and right sides. The field-of-view of the left eye in a case (reference line-of-sight 40) where the human line-of-sight is directed forward is about 94° on the left side and about 62° on the right side. Within this field-of-view, the limit of color discrimination in which the person can discriminate the color is about 30° to 60° on the left and right side.

For example, by displaying the virtual image 30 to fall within the horizontal maximum eye movement range, the user 1 can easily recognize the virtual image 30. On the other hand, in general, the display positions of the virtual images 30 to be displayed in accordance with the progress of the content and user operations (gesture operations or the like), also including the above-mentioned upper images 31, can be arbitrarily set. That is, the virtual images 30 to be displayed are not necessarily displayed at positions easy for the user 1 to visually recognize. Therefore, for example, situations where the user 1 loses track of the virtual image 30 and where the user 1 does not notice the displayed virtual image 30 may occur.

By the way, depending on the surrounding environment of the user 1, it may be possible to estimate a region (direction) or the like easy for the user 1 to visually recognize. In such a case, by setting the display position of the virtual image 30 to be in the region easy for the user 1 to visually recognize, the situation where the user 1 loses track of the virtual image 30 can be avoided. Hereinafter, display control based on the surrounding environment will be described specifically.

Figure 10:
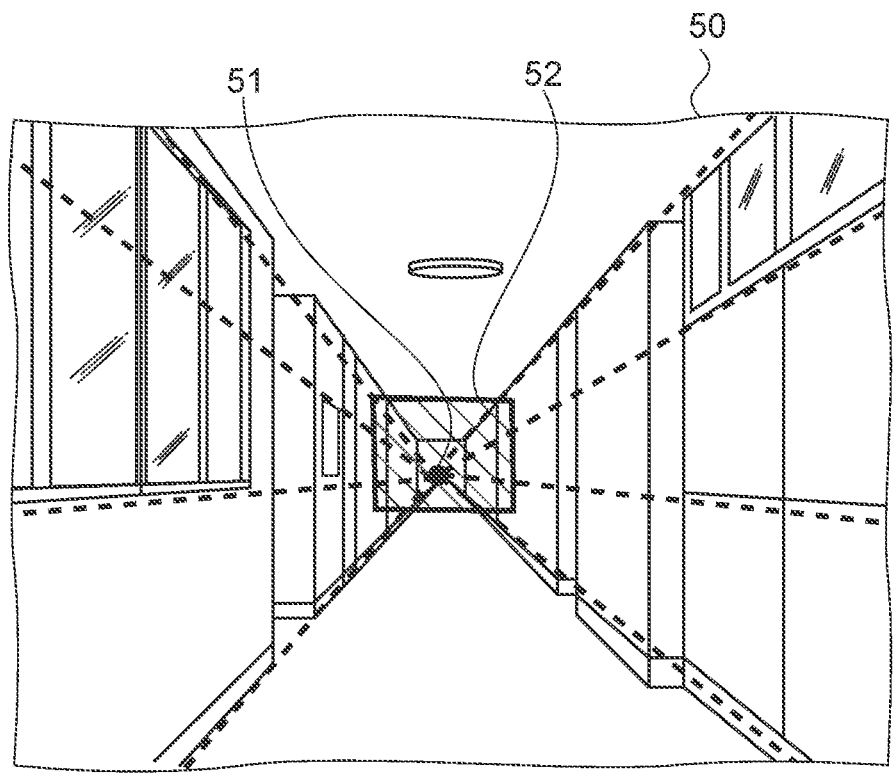
FIG. 10 A schematic diagram showing a display example of a virtual image corresponding to the environmental information.

FIG. 10 is a schematic diagram showing a display example of the virtual image 30 based on the environmental information. In FIG. 10, a field-of-view image 50 of the user 1 which has been taken by the rear-facing camera 16 is schematically shown. The field-of-view image 50 is an image of an indoor passageway and includes a single vanishing point 51 near the middle of the image. That is, the composition of the field-of-view image 50 can be considered as single point perspective. As such, in a case where the field-of-view of the user 1 can be considered as single point perspective, line-of-sight directions of the user 1 easily concentrate the vicinity of the vanishing point 51 in the field-of-view of the user 1. In other words, the vicinity of the vanishing point 51 is a region easy for the user 1 to visually recognize.

In this embodiment, the display position is controlled so that the virtual image 30 is displayed near the vanishing point 51. Specifically, the environmental information acquisition unit 23 determines whether or not the surrounding environment includes the vanishing point 51. Then, in a case where the surrounding environment includes the vanishing point 51, the layout calculation unit 26 sets the display position of the virtual image 30 by using the vanishing point 51 as the basis.

The environmental information acquisition unit 23 determines the presence/absence of the vanishing point 51 by, for example, detecting a feature amount of a straight line or the like from the field-of-view image 50 taken by the rear-facing camera 16. Alternatively, the vanishing point 51 may be detected by the use of three-dimensional data such as a space map, for example. Alternatively, in a case where the front-facing camera or the like that takes images of the eyes of the user 1 is provided, motions of the eyes of the user 1 may be detected. In this case, in an average motion of the eye is little (e.g., in a case where the motion of the line-of-sight of the user 1 is sufficiently smaller than the horizontal movement limit or the like), it may be determined that the vanishing point 51 is present, considering that single point perspective is used. In addition, the method of determining the presence/absence of the vanishing point 51 is not limited.

In a case where it is determined that the surrounding environment includes the vanishing point 51, the layout calculation unit 26 sets, for example, a display candidate region 52 (hashed rectangle in FIG. 10) using the vanishing point 51 as the basis. The display candidate region 52 is set to have a lateral width of about 10°, for example, in the horizontal field-of-view. The virtual image 30 is arranged to fall within the set display candidate region 52. Accordingly, for example, in a case where the user 1 is present in the surrounding environment including the vanishing point 51 like a passageway, the virtual image 30 is displayed in the vicinity of the vanishing point 51. Accordingly, the virtual image 30 can be displayed at a position to which the user 1 naturally directs the line-of-sight, and therefore the accessibility to the virtual image 30 can be sufficiently improved.

Moreover, in this embodiment, the layout calculation unit 26 determines whether or not to cause the virtual image 30 to fall within the display candidate region 52. Specifically, whether or not to cause it to fall within the display candidate region 52 is determined in accordance with a distance of a point of intersection (conflict point) between the line-of-sight of the user 1 and the surrounding environment converted into the space map. For example, in a case where the point of intersection is present in a range up to a short distance (about 3 m) at which the user can view the virtual image 30 stereoscopically, processing of displaying the virtual image 30 as it is without causing the virtual image 30 to fall within the display candidate region 52 is performed. That is, in a case where the line-of-sight of the user 1 is directed to a short distance, normal display processing is performed, and therefore the user 1 can easily recognize the virtual image 30.

[Features of Range-of-Motion]

Figure 11:
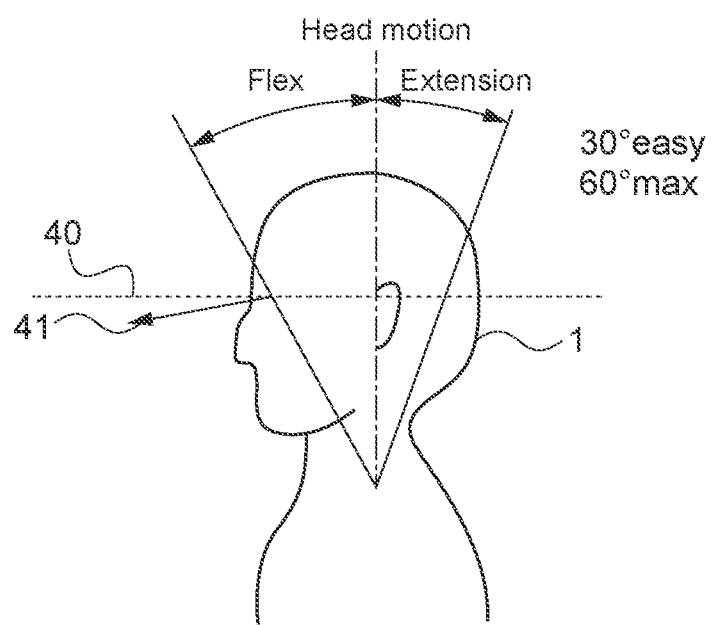
FIG. 11 A schematic diagram showing an example of features relating to a human range-of-motion.

FIG. 11 is a schematic diagram showing an example of features relating to a human range-of-motion. FIG. 11 schematically shows, using a state in which the person looks forward as the reference posture, examples of the range-of-motion of the neck at the time of flex to tilt the head forward and the range-of-motion of the neck at the time of extension to tilt the head downward. Easy flex angles at which the flex and extension can be easily performed are both about 30°. Moreover, maximum flex angles at which the flex and extension can be performed are both about 60°. Those features relating to the range-of-motion of the neck are included in the motion feature according to this embodiment.

In this embodiment, the determination condition is set in accordance with the range-of-motion of the user 1 in the posture of the user 1. For example, in the standing state in which the user 1 is standing, the easy flex angle and the maximum flex angle of the neck becomes larger as compared with the seated state in which the user 1 is seated. Moreover, in the standing state, the angle of tilt of the head that the user 1 can tilt by bending the waist also becomes larger as compared with the seated state. In accordance with such a difference of motion features of the neck and the waist, the determination conditions (upper threshold angle □ and lower threshold angle □) of the upward gesture and the downward gesture are set, which have been described above with reference to FIGS. 7A and 7B and the like.

The determination condition setting unit 24 sets, for example, reference threshold angles $\alpha_0$ and $\beta_0$ that are the reference for setting the upper threshold angle $\alpha$ and the lower threshold angle $\beta$ in accordance with the posture of the user 1. For example, in a case where the user 1 is in the seated state, the reference threshold angles $\alpha_0$ and $\beta_0$ are set to the upper limit value and the lower limit value of the movement limit of the eye shown in FIG. 4. Moreover, in a case where the user 1 is in the standing state, the reference threshold angles $\alpha_0$ and $\beta_0$ are set to be larger than values in the seated state. That is, in the standing state, ranges of threshold angles for determining the upward gesture and the downward gesture are adjusted to be wider than in the seated state.

The amounts of increase of the reference threshold angles $\alpha_0$ and $\beta_0$ in the standing state are set in accordance with the amounts of increase of the range-of-motion (easy flex angle and maximum flex angle or the like) in the standing state as compared with the seated state, for example. That is, the reference threshold angles $\alpha_0$ and $\beta 0$ are set in accordance with the movable range that extends when the user 1 stands up. It can also be said that the ranges of the threshold angles $\alpha$ and $\beta$ on the upper side and lower side are scaled in accordance with the range-of-motion. Accordingly, for example, each of the threshold angles $\alpha$ and $\beta$ can be set to be larger within a range in which the user 1 can move comfortably. As a result, without increasing the burden on the body of the user 1, erroneous detection and the like of the upward and downward gestures can be reduced.

It should be noted that the method of setting the threshold angle in accordance with the range-of-motion and the like are not limited. For example, the reference threshold angles $\alpha_0$ and $\beta_0$ in the seated state may be set in accordance with the range-of-motion. Moreover, rather than setting the reference threshold angles $\alpha_0$ and $\beta_0$, an amount of shift depending on the range-of-motion may be set in each posture. By adding this amount of shift to the threshold angles ($\alpha$ and $\beta$) set in accordance with the posture information of the user 1 and the environmental information, final threshold angles may be set. Moreover, the feature of the range-of-motion in each posture has individual differences, and therefore for example, a configuration to learn the range-of-motion of the user 1 and set threshold angles on the basis of the learning result may be employed.

[Field-of-View Feature According to Height]

Figure 12:
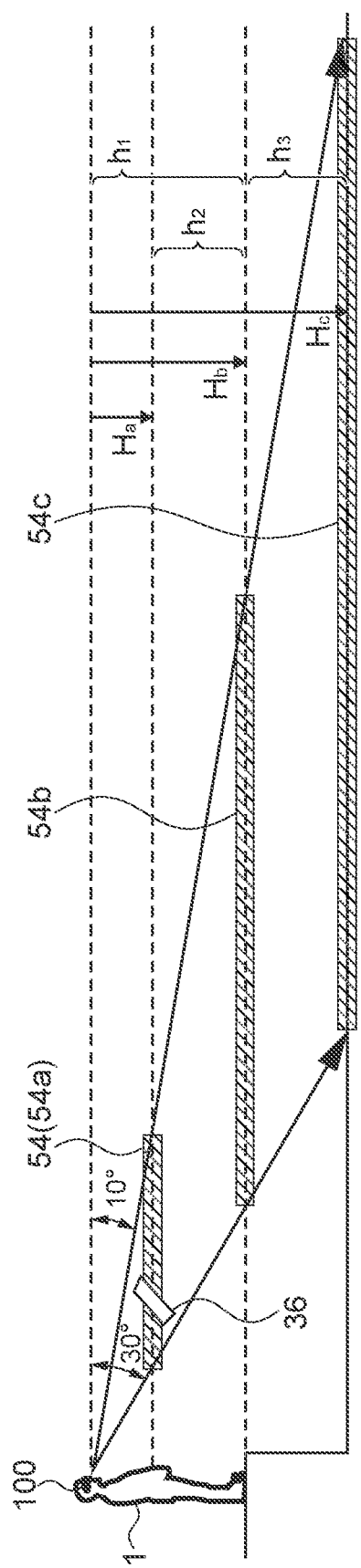
FIG. 12 A schematic diagram showing an example of the display position of the virtual image displayed on a diagonally lower side as viewed from the user.

FIG. 12 is a schematic diagram showing an example of display positions of virtual images 30 displayed on a diagonally lower side as viewed from the user 1. Examples of the virtual images 30 displayed on a diagonally lower side can include the virtual image 30c and the virtual image 30d (lower image 36) described above with reference to FIG. 3. Hereinafter, referring to FIG. 12, the method of setting the display position of the lower image 36 will be described.

In general, when the person looks diagonally down, a range in which an angle of depression $\gamma$ is approximately 10° to 30° is a range in which the person can easily visually recognize. Here, the angle of depression $\gamma$ is an angle of looking displayed on a diagonally lower side from the horizontal direction. Hereinafter, a region that falls within the above-mentioned angle of depression and has a constant height will be referred to as a lower display region 54. Moreover, the horizontal plane including the head of the user 1 (HMD 100) will be referred to as a reference horizontal plane 55. In FIG. 12, three kinds of lower display regions 54a to 54c whose relative distances H from the reference horizontal plane 55 are different are schematically shown as the hashed regions.

The lower display region 54 is a region whose horizontal distance from the user 1 is H/tan (10°) to H/tan (30°). As shown in FIG. 12, the front position of the lower display region 54 as viewed from the user 1 becomes further from the user 1 as the relative distance H from the reference horizontal plane 55 (height position of the head of the user 1) becomes longer. Moreover, the size (depth) of the lower display region 54 becomes larger as the relative distance H becomes longer. In this manner, in a case where the relative distance H differs, the position and the size of the lower display region 54 change.

In this embodiment, the layout calculation unit 26 sets the display position of the lower image 36 so that the lower image 36 falls within the lower display region 54. Specifically, the relative distance H (the height position of the virtual image 30) from the reference horizontal plane 55 at which the virtual image 30 is to be displayed is calculated on the basis of the height of the user 1, and the depth position of the virtual image 30 is set on the basis of the relative distance H. In this manner, in this embodiment, the display position of the lower image 36 is set in accordance with the height of the user 1.

Figure 13A:
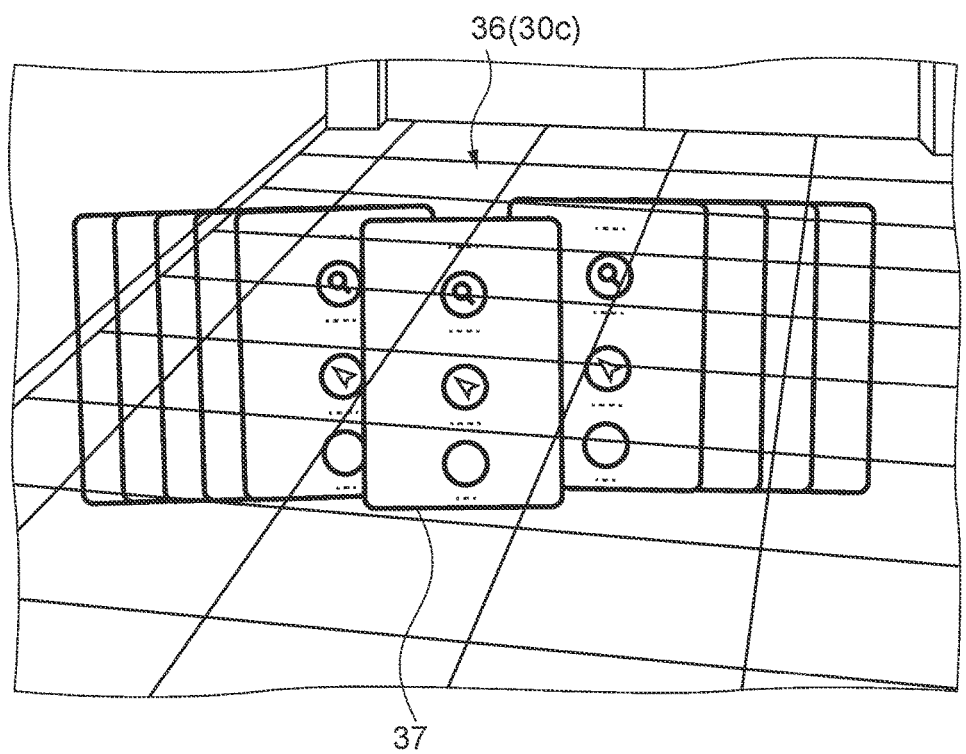
FIGS. 13A and 13B Schematic diagrams showing an example of a lower image.
Figure 13B:
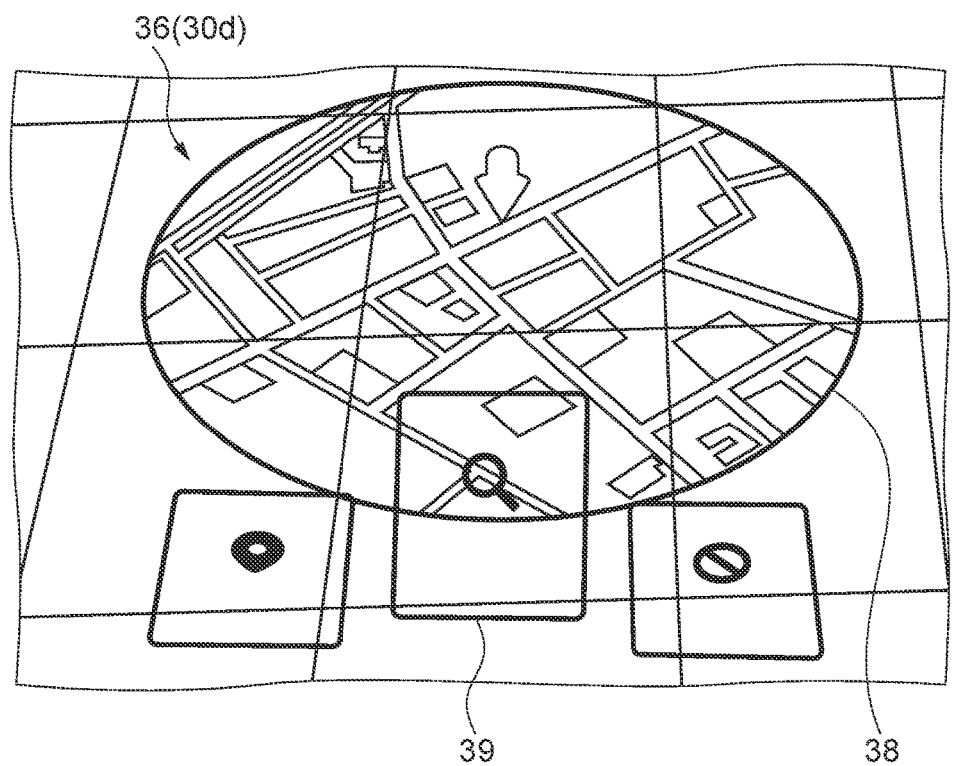

FIGS. 13A and 13B are schematic diagrams showing an example of the lower image 36. FIG. 13A is an example of the lower image 36 displayed around the body (around the waist) of the user 1 and is a display example of the virtual image 30c shown in FIG. 3. The virtual image 30c is a selection screen including a plurality of selection windows 37. For example, the user 1 can perform a gesture operation to selecting a desired window 37 from those windows 37 by rotating the head leftward and rightward. For example, such a virtual image 30c is displayed at the height of the abdomen of the user 1.

The virtual image 30c is arranged in the lower display region 54a set at a height approximately equivalent to that of the abdomen of the user 1 shown in FIG. 12. A relative distance $H_a$ of the lower display region 54a from the reference horizontal plane 55 is, for example, set to be the half of a height $h_1$ of the user 1 ($H_a=h_1/2$). Alternatively, for example, in a case where a height $h_2$ of the waist of the user 1 is read in or the like, a value obtained by subtracting the height $h_2$ of the waist from the height $h_1$ is set to the relative distance $H_a$ ($H_a=h_1-h_2$). In addition, the method of setting the relative distance $H_a$ for displaying the virtual image 30c is not limited.

When the relative distance $H_a$ is set, a horizontal position of the lower display region 54a is calculated, and the display position of the virtual image 30c is set to fall within the lower display region 54a. It should be noted that the virtual image 30c is an image to be displayed as if it were floating in the air, and is, for example, arranged to be tilted so that the user 1 can easily view the image. Accordingly, the user 1 can easily visually recognize the virtual image 30c displayed around the body of the user 1.

FIG. 13B is an example of the lower image 36 displayed on the floor of the periphery of the user 1 and is a display example the virtual image 30d shown in FIG. 3. The virtual image 30d is, for example, a screen displaying the navigation map 38 and the like. Moreover, in the example shown in FIG. 13B, an operation window 39 for performing a navigation operation is displayed, and the user 1 can perform various operations by performing a predetermined selection operation. For example, such a virtual image 30d is displayed on the floor.

The virtual image 30d is arranged in a lower display region 54b set at the same height as the floor on which the user 1 is standing, which is shown in FIG. 12. In this case, a relative distance $H_b$ of the lower display region 54b from the reference horizontal plane 55 is, for example, set as the height $h_1$ of the user 1 ($H_b=h_1$). Alternatively, for example, a value obtained by subtracting an amount of deviation of the mounting position of the HMD 100 from the height $h_1$ of the user 1 may be set as the relative distance $H_b$. In addition, the method of setting the relative distance $H_b$ for displaying the virtual image 30d is not limited.

When the relative distance $H_b$ is set, a horizontal position of the lower display region 54b is calculated, and the display position of the virtual image 30d is set to fall within the lower display region 54b. The virtual image 30d is, for example, an image to be displayed along the floor. Therefore, the user 1 can visually recognize the navigation map and the like displayed using the floor of the periphery as the screen. Moreover, the virtual image 30d is displayed at a position that the user 1 can easily visually recognize, and therefore it is, for example, unnecessary for the user 1 to unnecessarily bend the neck, and the burden on the body of the user 1 can be sufficiently reduced.

The lower display region 54c shown in FIG. 12 is a region set in a case where the floor of the periphery of the user 1 is provided with a step or the like. In this case, using the height of the user 1 (physical information) and the height of the floor position (environmental information), a relative distance Hc of the lower display region 54c with respect to the reference horizontal plane 55 is set.

First of all, the environmental information acquisition unit 23 detects the position of the floor as the environmental information. For example, in a case where a step or the like lower than the position at which the user 1 is standing is present, a height $h_3$ of the step is detected on the basis of the depth data, the space map, or the like. Then, the layout calculation unit 26 sets a relative distance $H_c$ ($H_c=h_1+h_3$) of the lower display region 54c at the same height as the lower floor from the height $h_1$ of the user 1 and the height $h_3$ of the step. Accordingly, even in a case where the floor has the step or the like, the image displayed along the floor like the virtual image 30d can be displayed in a range easy for the user 1 to view. In this manner, in this embodiment, the display position of the virtual image 30d is set in accordance with the position of the floor.

For example, between a tall user 1 and a short user 1, the regions that the users 1 visually recognize are different even when the users 1 looks down at the same angle of depression 7. Therefore, the region that the user 1 can look down easily is different for each height of the user 1. Moreover, in a case of performing the display along the floor or the like, the region in which the display can be easily visually recognized changes also depending on the difference of the height of the floor. In this embodiment, the display position of the lower image 36 is controlled in accordance with the height of the user 1 and the position of the floor. Accordingly, irrespective of the height and the height of the floor, display easy for the user 1 to view can be realized, and excellent usability can be provided.

It should be noted that the lower image 36 is, for example, displayed by the user 1 performing the downward gesture of moving the head downward. The determination condition for determining this downward gesture (lower threshold angle β or the like) may be set in accordance with the height of the user 1. For example, it is conceivable that when the user 1 performs a motion of looking down the floor or the like, the motion (the pitch angle of the head) becomes larger as the height becomes higher. In accordance with such a feature, for example, adjustment to set the lower threshold angle β to be larger as the height becomes higher can be performed. Accordingly, the lower image 36 or the like can be displayed by a natural motion irrespective of the height of the user 1.

Hereinabove, the processing using the field-of-view feature and the motion feature depending on the posture and the height of the user 1 has been mainly described. Those features can differ in a manner that depends on the age and the gender of the user 1, for example. For example, the human field-of-view range and the range-of-motion differ in a manner that depends on the age. In view of such difference of the features for each age, the setting of the determination condition, the control of the display positions of the virtual images 30, and the like may be performed. Moreover, those features have individual differences. For example, the tendence of the motion range or the like related to the gesture may be learned for each user 1 and the physical feature information of the individual user 1 may be calculated on the basis of the learning result. By performing the setting of the determination condition or the like in accordance with this physical feature information, the operability in virtual experience can be sufficiently improved.

Hereinafter, in the controller 20 according to this embodiment, the determination condition of the trigger gesture that is the trigger for the operation input by the gesture is set on the basis of the physical information of the user 1 wearing the HMD 100. Using this determination condition, whether or not the trigger gesture is performed is determined on the basis of the gesture information and the output corresponding to the trigger gesture is controlled on the basis of the determination result. Accordingly, the trigger gesture performed the user 1 is determined in accordance with the physical information of the user 1, and therefore the operability of gesture operations can be improved.

In this embodiment, the determination condition appropriate to the state of the user 1 is set using the physical information such as the posture and height of the user 1. Moreover, the determination condition is set in accordance with the surrounding environment such as the presence/absence of the ceiling. As described above, by setting the determination condition, the trigger gesture of the user 1 can be determined within a range in which the user 1 can naturally move or a range in which the user 1 can easily move. Accordingly, the user 1 can easily perform the gesture operation irrespective of the state of the user 1, and a user interface having a small physical burden can be realized.

Moreover, the display positions of the virtual images 30 are controlled in accordance with the physical information and the environmental information. Accordingly, displaying the virtual image 30 in a manner easy to view and displaying the virtual image 30 in a manner easy to find can be performed, and high visibility can be ensured. Moreover, the display easy for the user 1 to visually recognize can be performed, and high accessibility and usability can be realized.

Other Embodiments

The present technology is not limited to the above-mentioned embodiments, and various other embodiments can be realized.

Hereinabove, the trigger gestures for the display operation of causing the virtual image to be displayed or the non-display operation of causing the virtual image not to be displayed have been described. The present technology is not limited thereto, and a determination condition for determining a trigger gesture for other operation processing may be set on the basis of the physical information and the like of the user.

For example, the trigger gesture that is the trigger for the selection operation of selecting the virtual image may be used. In this case, the determination condition of the trigger gesture for the selection operation is set on the basis of the physical information of the user 1 or the like. For example, in the virtual image 30c shown in FIG. 13A, a plurality of windows is displayed and the user 1 selects a desired window by the motion of moving the head leftward and rightward. The threshold angle with respect to the posture angle (yaw angle) that changes depending on this motion of moving the head leftward and rightward is set in accordance with the physical information of the user 1 or the like. For example, in the standing state, the waist more easily rotates as compared with the seated state, and therefore the yaw angle of the head can be moved widely. In accordance with such a feature, for example, the threshold angle with respect to the yaw angle is set to be larger in the standing state as compared with the seated state. Accordingly, the selection operation can be performed by an easy motion, and erroneous detection and the like caused by a small threshold angle can be avoided.

Moreover, the present technology is not limited to the gesture with the head, and determination conditions about trigger gestures that the user performs with the arms and legs may be set. For example, the virtual image 30c shown in FIG. 13A is displayed around the body of the user. The selection operation may be performed by reaching the user's hand to the selection window 37 displayed as this virtual image 30c. In this case, the user's gesture of reaching the hand beyond a predetermined region is the trigger gesture for the selection operation, and a range of the predetermined region is the determination condition (determination threshold). For example, in the standing state, a motion range (motion feature of the hands) in which the user can move the hands is wider as compared with the seated state. Therefore, in the standing state, a region that is the determination threshold is set to be wider than in the seated state. Accordingly, the user can perform the selection operation in the range in which the user can easily move the hands irrespective of the posture.

Alternatively, the user may perform the selection operation by moving the legs. For example, the virtual image 30d shown in FIG. 13B is displayed near the legs of the user. The user may perform the selection operation by stepping on the operation window 39 included in this virtual image 30d. In this case, the user's gesture of extending the leg beyond a predetermined region is the trigger gesture for the selection operation and a range of the predetermined region is the determination threshold. For example, in the standing state, a region that is the determination threshold is set to be wider than in the seated state. Accordingly, irrespective of whether the user is seated or standing, the user can easily perform the selection operation by the leg. For example, such processing can be performed.

In addition, the types of the trigger gesture and the determination threshold are not limited. A determination threshold for determining the trigger gesture may be set as appropriate, for example, in accordance with the physical feature information of the user about a site (neck, hands, legs, waist, etc.) that moves when performing a trigger gesture. Moreover, in a case where the motion range or the like of each site changes due to a change of the environment, the determination threshold is adjusted in accordance with the change. Accordingly, the gesture operation with high operability can be realized in accordance with the user's state and the surrounding situation.

Hereinabove, as the method of determining the trigger gesture, the threshold processing using the determination threshold has been mainly described. The present technology is not limited to the method of determining the trigger gesture. For example, instead of the threshold processing, the trigger gesture can also be determined by the use of a classifier (learned model) built by machine learning such as deep learning.

The classifier is capable of determining whether or not the trigger gesture is performed by learning various parameters and the like based on the machine learning algorithm, for example, by training using a predetermined data set. In this manner, the parameters that the classifier learns can be considered as the determination condition for determining the trigger gesture. By inputting the gesture information of the user or the like into this classifier, whether or not the gesture is the trigger gesture is determined and the gesture determination result is output. The algorithm for building the classifier is not limited, and an arbitrary algorithm capable of detecting the type of the gesture, the amount of motion, and the like may be used.

For example, a data set in which gesture inputs (gesture information) are correlated to gesture determination results of the gesture inputs is used for training the classifier. In this case, using a plurality of data sets corresponding to the posture and the state such as the height, a plurality of classifiers appropriate to the respective states is built and stored in the storage unit or the like. When determining the trigger gesture, the gesture detection unit (control unit) selects and uses a classifier appropriate to the user's state, i.e., the physical feature of the user on the basis of the physical information of the user. For example, a classifier for the seated state is used in a case where the user is in the seated state, and a classifier for the standing state is used in a case where the user is in the standing state. Accordingly, determination processing of the trigger gesture that is appropriate to the posture and the height of the user or the like can be performed, and the operability of gesture operations can be improved.

Alternatively, for example, the classifier trained using the physical feature information such as the field-of-view range and the motion range may be used. In this case, the classifier has the gesture information and the physical feature information as the input and outputs the gesture determination result. Accordingly, determination processing of the trigger gesture appropriate to the physical feature information of the user can be performed. Moreover, the physical feature of the user have individual differences. The classifier may learn parameters depending on the physical feature of each user on the basis of the physical feature information of the individual user. Accordingly, the operability of gesture operations can be greatly improved.

In the above-mentioned embodiment, virtual experience using augmented reality (AR) is provided from the HMD (AR glasses) including the see-through display. The present technology is not limited thereto, and for example, the present technology can also be applied to an immersive HMD or the like that realizes AR display by displaying an image of the real space which has been taken through the rear-facing camera or the like. Moreover, the present technology can also be applied in a case where virtual experience using virtual reality (VR) is provided by the use of the immersive HMD or the like. In this case, the determination condition for determining the trigger gesture (determination threshold or the like) is set by detecting the posture and the like of the user experiencing VR.

Hereinabove, control of the image output corresponding to the trigger gesture has been described. The output corresponding to the trigger gesture is not limited to the image output, and the audio output or the tactile output corresponding to the trigger gesture may be controlled. For example, an operation of controlling the sound volume of sound or the like output from the speaker mounted on the HMD by the gesture operation may be capable of being performed. Alternatively, for example, in a case where a tactile presentation device such as a vibration actuator is mounted, the type and strength of the tactile sense and the like may be capable of being adjusted by the gesture operation. Thus, high operability can be provided by setting as appropriate the determination condition of the trigger gesture on the basis of the physical information of the user even in a case where the audio output or the tactile output is controlled.

As an apparatus using the head-mounted casing (head-mounted apparatus), the headphones, the earphones, or the like may be used. For example, by mounting the 9-axis sensor on the wireless headphones, the wired headphones, or the like, the motion of the head of the user and the like can be detected. In this case, an operation such as sound volume control and music selection is performed as the gesture operation using the trigger gesture as the trigger. Alternatively, in a case where the tactile presentation device is mounted on the headphones, the tactile output may be capable of being controlled by the gesture operation.

In addition, the present technology is not limited to the head-mounted type apparatus, and the present technology can be applied to an arbitrary wearable device capable of detecting a gesture of the user. The user's gestures can be detected using, for example, devices to be mounted on the fingers, the wrist, the body, the waist, the ankles, or the like. As described above, the amount of motion of the gesture of the user and the like change depending on the physical feature of the user and the environment. For example, by changing the determination condition of the trigger gesture that each device is capable of detecting in accordance with the physical information and the environmental information, the trigger detection of the gesture operation can be properly performed.

For instance, it is assumed that using devices mounted on the wrist and the fingers, a hand gesture using the hands is detected. In this case, it is conceivable that the amount of motion of the hand gesture (e.g., the range to move the arms) can change between the seated state and the standing state. In each device, the determination condition of the trigger gesture is set in accordance with such a change of the gesture that depends on the posture. Accordingly, the gesture detection accuracy can be increased. In addition, the determination condition for determining the gesture that each device is capable of detecting may be set as appropriate.

Hereinabove, as the embodiment of the information processing apparatus according to the present technology, the head-mounted apparatus such as the HMD and the headphones has been taken as the example. However, the information processing apparatus according to the present technology may be realized by an arbitrary computer that is configured separate from the head-mounted apparatus and is connected to the head-mounted apparatus with a wire or wirelessly. For example, an external apparatus that controls the head-mounted apparatus, such as a PC to be connected to the HMD and a smartphone to be connected to a game console or headphones may be used as the information processing apparatus according to the present technology. Alternatively, for example, the information processing method according to the present technology may be performed by a cloud server. Alternatively, the information processing method according to the present technology may be performed by cooperation of the HMD or the like with another computer.

That is, the information processing method and the program according to the present technology may be performed not only in a computer system configured by a single computer but also in a computer system in which a plurality of computers cooperatively operate. It should be noted that in the present disclosure, the system means a set of a plurality of components (apparatus, module (parts), etc.) and it does not matter whether or not all the components are housed in the same casing. Therefore, both of a plurality of apparatuses housed in separate casings and connected to one another via a network and a single apparatus having a plurality of modules housed in a single casing are the system.

Performing the information processing method and the program according to the present technology by the computer system includes, for example, both of a case where a single computer performs acquisition of the gesture information, setting of the determination condition of the trigger gesture, and output control based on the determination result of the trigger gesture using the determination condition, and the like and a case where different computers execute these processes. Moreover, performing the respective processes by a predetermined computer includes causing another computer to execute some or all of those processes and acquire the results.

That is, the information processing method and the program according to the present technology are also applicable to a cloud computing configuration in which a plurality of apparatuses shares and cooperatively processes a single function via a network.

At least two features of the features according to the present technology which have been described above may be combined. That is, the various features described in the respective embodiments may be arbitrarily combined across the respective embodiments. Moreover, the above-mentioned various effects are merely exemplary and not limitative, and other effects may be provided.

In the present disclosure, it is assumed that "the same", "equal", "orthogonal", and the like are concepts including "substantially the same", "substantially equal", "substantially orthogonal", and the like. For example, also include states included in a predetermined range (e.g., ±10% range) using "completely the same", "completely equal", "completely orthogonal", and the like as the basis.

It should be noted that the present technology can also take the following configurations.

(1) An information processing apparatus, including:
a physical information acquisition unit that acquires physical information of a user wearing a head-mounted casing;
a gesture information acquisition unit that acquires gesture information regarding a gesture of the user;
a determination condition setting unit that sets, on the basis of the physical information, a determination condition for determining a trigger gesture that is a trigger for an operation input by the gesture of the user; and
a control unit that determines, on the basis of the gesture information and the determination condition, whether or not the trigger gesture is performed and controls, on the basis of a result of the determination, an output corresponding to the trigger gesture.

(2) The information processing apparatus according to (1), in which
the determination condition setting unit sets the determination condition on the basis of physical feature information of the user, the physical feature information corresponding to the physical information.

(3) The information processing apparatus according to (2), in which
the physical feature information includes information regarding at least one of a field-of-view feature or a motion feature of the user.

(4) The information processing apparatus according to any one of (1) to (3), in which
the determination condition includes a determination threshold for determining the trigger gesture.

(5) The information processing apparatus according to any one of (1) to (4), in which
the physical information acquisition unit acquires a posture of the user as the physical information, and
the determination condition setting unit sets the determination condition in accordance with the posture of the user.

(6) The information processing apparatus according to (5), in which
the determination condition setting unit sets the determination condition in accordance with at least one of a field-of-view feature or a motion feature in the posture of the user.

(7) The information processing apparatus according to (5) or (6), in which
the trigger gesture is a head gesture of the user moving the head upward,
the determination condition includes a threshold angle with respect to a posture angle of the head of the user, the posture angle changing in a manner that depends on the head gesture,
the physical information acquisition unit detects a standing state or a seated state as the posture of the user, and
the determination condition setting unit sets, in a case where the seated state is detected, the threshold angle to be a smaller value than in a case where the standing state is detected.

(8) The information processing apparatus according to any one of (1) to (7), in which
the head-mounted casing is a casing for a head-mounted display that displays a virtual image, and
the control unit controls a display position of the virtual image on the basis of the physical information.

(9) The information processing apparatus according to (8), in which
the physical information acquisition unit acquires a posture of the user as the physical information,
the control unit controls the display position of the virtual image in accordance with the posture of the user.

(10) The information processing apparatus according to (9), in which
the virtual image is an upper image to be displayed on a diagonally upper side as viewed from the user, the physical information acquisition unit detects a standing state or a seated state as the posture of the user, and the control unit sets, in a case where the seated state is detected, the display position of the upper image to be a lower position than in a case where the standing state is detected.

(11) The information processing apparatus according to any one of (8) to (10), in which the physical information acquisition unit acquires a height of the user as the physical information, the virtual image is a lower image to be displayed on a diagonally lower side as viewed from the user, the control unit sets a display position of the lower image in accordance with the height of the user.

(12) The information processing apparatus according to any one of (1) to (11), further including an environmental information acquisition unit that acquires environmental information regarding a surrounding environment of the user.

(13) The information processing apparatus according to (12), in which the determination condition setting unit sets the determination condition on the basis of the environmental information.

(14) The information processing apparatus according to (13), in which the trigger gesture is a head gesture of the user moving the head upward, the determination condition includes a threshold angle with respect to a posture angle of the head of the user, the posture angle changing in a manner that depends on the head gesture, the environmental information acquisition unit detects presence/absence of a ceiling in the surrounding environment, and the determination condition setting unit sets, in a case where the ceiling is detected, the threshold angle to be a smaller value than in a case where the ceiling is not detected.

(15) The information processing apparatus according to any one of (12) to (14), in which the head-mounted casing is a casing for a head-mounted display that displays a virtual image, and the control unit controls a display position of the virtual image on the basis of the environmental information.

(16) The information processing apparatus according to (15), in which the environmental information acquisition unit determines whether or not the surrounding environment includes a vanishing point, and the control unit sets, in a case where the surrounding environment includes the vanishing point, the display position of the virtual image by using the vanishing point as a basis.

(17) The information processing apparatus according to (15) or (16), in which the environmental information acquisition unit detects a position of a floor as the environmental information, and the control unit sets the display position of the virtual image in accordance with the position of the floor.

(18) The information processing apparatus according to any one of (1) to (17), in which the head-mounted casing is a casing for a head-mounted display that displays a virtual image, and the trigger gesture functions as a trigger for a display operation of causing the virtual image to be displayed, a trigger for a non-display operation of causing the virtual image not to be displayed, or a trigger for a selection operation of selecting the virtual image.

(19) An information processing method, including:

by computer system, acquiring physical information of a user wearing a head-mounted casing;

acquiring gesture information regarding a gesture of the user;

setting, on the basis of the physical information, a determination condition for determining a trigger gesture that is a trigger for an operation input by the gesture of the user; and determining, on the basis of the gesture information and the determination condition, whether or not the trigger gesture is performed and controlling output corresponding to the trigger gesture on the basis of a result of the determination.

(20) A program that causes a computer system to execute:

a step of acquiring physical information of a user wearing a head-mounted casing;

a step of acquiring gesture information regarding a gesture of the user;

a step of setting, on the basis of the physical information, a determination condition for determining a trigger gesture that is a trigger for an operation input by the gesture of the user; and a step of determining, on the basis of the gesture information and the determination condition, whether or not the trigger gesture is performed and controlling output corresponding to the trigger gesture on the basis of a result of the determination.

REFERENCE SIGNS LIST 1 user
5 head-mounted casing
10 display unit
14 sensor unit
15 storage unit
20 controller
21 physical information acquisition unit
22 gesture information acquisition unit
23 environmental information acquisition unit
24 determination condition setting unit
25 gesture detection unit
26 layout calculation unit
27 layout determination unit
28 output control unit
30, 30a to 30g virtual image
31 upper image
36 lower image
51 vanishing point
100 HMD

The invention claimed is:

1. An information processing apparatus, comprising:
circuitry configured to:
  detect, as a posture of a user who wears a head-mounted casing, one of a standing state of the user or a seated state of the user;
  acquire gesture information regarding a gesture of the user;

set, based on the posture of the user, a determination condition to determine a trigger gesture that is a trigger for an operation input by the gesture of the user, wherein
the trigger gesture includes a head gesture of moving a head of the user upward,
the determination condition includes a threshold angle with respect to a posture angle of the head of the user, and
the posture angle is changeable based on the head gesture;
set, in a case where the seated state is detected, the threshold angle to be a smaller value than in a case where the standing state is detected;
determine, based on the gesture information and the determination condition, whether the trigger gesture is performed; and
control, based on a result of the determination, an output corresponding to the trigger gesture.

2. The information processing apparatus according to claim 1, wherein the circuitry is further configured to set the determination condition based on physical feature information of the user.

3. The information processing apparatus according to claim 2, wherein the physical feature information includes information regarding at least one of a field-of-view feature or a motion feature of the user.

4. The information processing apparatus according to claim 1, wherein the determination condition further includes a determination threshold to determine the trigger gesture.

5. The information processing apparatus according to claim 1, wherein the circuitry is further configured to set the determination condition based on at least one of a field-of-view feature or a motion feature in the posture of the user.

6. The information processing apparatus according to claim 1, wherein the head-mounted casing is a casing for a head-mounted display that displays a virtual image.

7. The information processing apparatus according to claim 6, wherein the circuitry is further configured to control a display position of the virtual image based on the posture of the user.

8. The information processing apparatus according to claim 7, wherein
the virtual image is an upper image to be displayed on a diagonally upper side as viewed from the user, and
the circuitry is further configured to set, in the case where the seated state is detected, the display position of the upper image to be a lower position than in the case where the standing state is detected.

9. The information processing apparatus according to claim 6, wherein the circuitry is further configured to:
acquire physical information indicating a height of the user,
wherein the virtual image is a lower image to be displayed on a diagonally lower side as viewed from the user, and
set a display position of the lower image based on the height of the user.

10. The information processing apparatus according to claim 1, wherein the circuitry is further configured to acquire environmental information regarding a surrounding environment of the user.

11. The information processing apparatus according to claim 10, wherein the circuitry is further configured to set the determination condition based on the environmental information.

12. The information processing apparatus according to claim 11, wherein the circuitry is further configured to:
detect one of a presence or an absence of a ceiling in the surrounding environment, and
set, in a case where the ceiling is present in the surrounding environment, the threshold angle to be the smaller value than in a case where the ceiling is absent in the surrounding environment.

13. The information processing apparatus according to claim 10, wherein
the head-mounted casing is a casing for a head-mounted display that displays a virtual image, and
the circuitry is further configured to control unit a display position of the virtual image based on the environmental information.

14. The information processing apparatus according to claim 13, wherein the circuitry is further configured to:
determine the surrounding environment includes a vanishing point, and
set, based on the determination that the surrounding environment includes the vanishing point, the display position of the virtual image by using the vanishing point.

15. The information processing apparatus according to claim 13, wherein the circuitry is further configured to:
detect a position of a floor as the environmental information, and
set the display position of the virtual image based on the position of the floor.

16. The information processing apparatus according to claim 1, wherein
the head-mounted casing is a casing for a head-mounted display that displays a virtual image, and
the trigger gesture functions as one of a trigger for a display operation of causing the virtual image to be displayed, a trigger for a non-display operation of causing the virtual image not to be displayed, or a trigger for a selection operation of selecting the virtual image.

17. An information processing method, comprising:
by a computer system,
detecting, as a posture of a user wearing a head-mounted casing, one of a standing state of the user or a seated state of the user;
acquiring gesture information regarding a gesture of the user;
setting, based on the posture of the user, a determination condition for determining a trigger gesture that is a trigger for an operation input by the gesture of the user, wherein
the trigger gesture includes a head gesture of moving a head of the user upward,
the determination condition includes a threshold angle with respect to a posture angle of the head of the user, and
the posture angle is changeable based on the head gesture;
setting, in a case where the seated state is detected, the threshold angle to be a smaller value than in a case where the standing state is detected;
determining, based on the gesture information and the determination condition, whether the trigger gesture is performed; and
controlling an output corresponding to the trigger gesture based on a result of the determination.

18. A non-transitory computer-readable medium having stored thereon, computer-executable instructions which, when executed by a computer, cause the computer to execute operations, the operations comprising:
- detecting, as a posture of a user wearing a head-mounted casing, one of a standing state of the user or a seated state of the user;
- acquiring gesture information regarding a gesture of the user;
- setting, based on the posture of the user, a determination condition for determining a trigger gesture that is a trigger for an operation input by the gesture of the user, wherein
  - the trigger gesture includes a head gesture of moving a head of the user upward,
  - the determination condition includes a threshold angle with respect to a posture angle of the head of the user, and
  - the posture angle is changeable based on the head gesture;
- setting, in a case where the seated state is detected, the threshold angle to be a smaller value than in a case where the standing state is detected;
- determining, based on the gesture information and the determination condition, whether the trigger gesture is performed; and
- controlling an output corresponding to the trigger gesture based on a result of the determination.

19. An information processing apparatus, comprising:
circuitry configured to:
- acquire physical information of a user who wears a head-mounted casing, wherein
  - the physical information indicates a height of the user,
  - the head-mounted casing is a casing for a head-mounted display that displays a virtual image, and
  - the virtual image is a lower image to be displayed on a diagonally lower side as viewed from the user;
- set a display position of the lower image based on the height of the user;
- acquire gesture information regarding a gesture of the user;
- set, based on the physical information, a determination condition to determine a trigger gesture that is a trigger for an operation input by the gesture of the user;
- determine, based on the gesture information and the determination condition, whether the trigger gesture is performed; and
- control, based on a result of the determination, an output corresponding to the trigger gesture.

* * * * *